United States Patent
Fujita et al.

(10) Patent No.: US 9,376,621 B2
(45) Date of Patent: Jun. 28, 2016

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventors: Yukihiro Fujita, Chiba (JP); Yoshimasa Furusato, Chiba (JP)

(73) Assignees: JNC CORPORATION, Tokyo (JP); JNC PETROCHEMICAL CORPORATION, Tokyo (JP)

(*) Notice: Subject to any disclaimer, the term of this patent is extended or adjusted under 35 U.S.C. 154(b) by 0 days.

(21) Appl. No.: 14/537,860

(22) Filed: Nov. 10, 2014

(65) Prior Publication Data

US 2015/0129801 A1    May 14, 2015

(30) Foreign Application Priority Data

Nov. 11, 2013  (JP) ................................. 2013-233317

(51) Int. Cl.
| | |
|---|---|
| *C09K 19/34* | (2006.01) |
| *C09K 19/30* | (2006.01) |
| *C09K 19/32* | (2006.01) |
| *C09K 19/04* | (2006.01) |
| *C09K 19/54* | (2006.01) |

(52) U.S. Cl.
CPC ......... *C09K 19/3402* (2013.01); *C09K 19/3066* (2013.01); *C09K 19/3068* (2013.01); *C09K 19/32* (2013.01); *C09K 19/3411* (2013.01); C09K 2019/0448 (2013.01); C09K 2019/3009 (2013.01); C09K 2019/3027 (2013.01); C09K 2019/3416 (2013.01); C09K 2019/3422 (2013.01); C09K 2019/3425 (2013.01); C09K 2019/548 (2013.01)

(58) Field of Classification Search
CPC .................................................. C09K 19/3066
USPC ..................................................... 252/299.61
See application file for complete search history.

(56) References Cited

U.S. PATENT DOCUMENTS

| | | |
|---|---|---|
| 2004/0011996 A1 | 1/2004 | Klasen-Memmer et al. |
| 2005/0116200 A1 | 6/2005 | Nakanishi et al. |
| 2010/0304049 A1 | 12/2010 | Bernatz et al. |
| 2010/0309423 A1 | 12/2010 | Bernatz et al. |

FOREIGN PATENT DOCUMENTS

| | | | |
|---|---|---|---|
| EP | 1889894 | 2/2008 | |
| EP | 1889894 B1 | 10/2009 | |
| JP | 2003-307720 | 10/2003 | |
| JP | 2004-131704 | 4/2004 | |
| JP | 2006-133619 | 5/2006 | |
| JP | 2010-537010 | 12/2010 | |
| JP | 2010-537256 | 12/2010 | |
| WO | WO 2012086718 A1 * | 6/2012 | .............. C08F 32/02 |

* cited by examiner

*Primary Examiner* — Chanceity Robinson
(74) *Attorney, Agent, or Firm* — Jianq Chyun IP Office

(57) ABSTRACT

A liquid crystal composition that includes a polymerizable compound having a high solubility, a composition obtained by polymerizing the polymerizable compound in the liquid crystal composition, and an AM device including any of the compositions are described. The liquid crystal composition has negative dielectric anisotropy, and includes at least one compound selected from the group of compounds represented by formula (1):

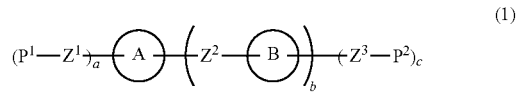

(1)

wherein $P^1$ and $P^2$ are polymerizable groups, and, for example, ring A and ring B are independently an adamantane ring or a noradamantane ring, $Z^1$, $Z^2$ and $Z^3$ are a single bond, and a, b and c are 1.

17 Claims, No Drawings

LIQUID CRYSTAL COMPOSITION AND LIQUID CRYSTAL DISPLAY DEVICE

CROSS-REFERENCE TO RELATED APPLICATION

This application claims the priority benefit of Japan application serial no. 2013-233317, filed on Nov. 11, 2013. The entirety of the above-mentioned patent application is hereby incorporated by reference herein and made a part of this specification.

TECHNICAL FIELD

The invention relates to a liquid crystal composition, a liquid crystal display (LCD) device including this composition, and so forth, particularly to a liquid crystal composition having a negative dielectric anisotropy, and an LCD device including this composition and having a mode such as IPS, VA, FFS or FPA. The invention also relates to an LCD device of a polymer sustained alignment (PSA) type.

TECHNICAL BACKGROUND

For LCD devices, a classification based on the operating mode of liquid crystal molecules includes modes such as PC (Phase Change), TN (Twisted Nematic), STN (Super Twisted Nematic), ECB (Electrically Controlled Birefringence), OCB (Optically Compensated Bend), IPS (In-Plane Switching), VA (Vertical Alignment), FFS (Fringe Field Switching) and FPA (Field-induced Photo-reactive Alignment). A classification based on the driving mode of the device includes PM (passive matrix) and AM (active matrix) types. The PM types are classified into static type, multiplex type and so forth, and the AM types are classified into TFT (thin film transistor) types, MIM (metal-insulator-metal) types and so forth. The TFT types are classified into amorphous silicon types and polycrystal silicon types. The latter are classified into a high-temperature type and a low-temperature type depending on the production process. A classification based on the light source includes a reflection type utilizing natural light, a transmission type utilizing a backlight, and a semi-transmission type utilizing both natural light and a backlight.

The LCD device includes a liquid crystal composition having a nematic phase. This composition has suitable characteristics. An AM device having good characteristics can be obtained by improving of the characteristics of this composition. Table 1 below summarizes the relationship between these two groups of characteristics. The characteristics of the composition will be further explained on the basis of a commercially available AM device. The temperature range of a nematic phase relates to the temperature range in which the device can be used. A desirable maximum temperature of the nematic phase is about 70° C. or higher and a desirable minimum temperature of the nematic phase is about −10° C. or lower. The viscosity of the composition relates to the response time of the device. A short response time is desirable for displaying moving images on the device. Response time that is one millisecond shorter than that of the other devices is desirable. Thus, a small viscosity of the composition is desirable. A small viscosity at a low temperature is more desirable.

TABLE 1

Characteristics of Composition and AM Device

| No. | General Characteristics of Composition | General Characteristics of AM Device |
| --- | --- | --- |
| 1 | Wide temperature range of a nematic phase | Wide temperature range in which the device can be used |
| 2 | Small viscosity[1] | Short response time |
| 3 | Suitable optical anisotropy | Large contrast ratio |
| 4 | Large positive or large negative dielectric anisotropy | Low threshold voltage, low power consumption, and large contrast ratio |
| 5 | Large specific resistance | Large voltage holding ratio, and large contrast ratio |
| 6 | High stability to UV light and heat | Long service life |

[1] A liquid crystal composition can be injected into a liquid crystal cell in a shorter period of time.

The optical anisotropy of the composition relates to the contrast ratio of the device. A large optical anisotropy or a small optical anisotropy, namely a suitable optical anisotropy, is necessary depending on the mode of the device. The product (Δn×d) of the optical anisotropy (Δn) of the composition and the cell gap (d) of the device is designed so as to maximize the contrast ratio. A suitable value of the product depends on the type of operating mode. This value is in the range of about 0.30 μm to about 0.40 μm for a device having a VA mode, and in the range of about 0.20 μm to about 0.30 μm for a device having an IPS mode or an FFS mode. In these cases, a composition having a large optical anisotropy is desirable for a device having a small cell gap. A large dielectric anisotropy of the composition contributes to a low threshold voltage, low power consumption and a large contrast ratio of the device. A large dielectric anisotropy is thus desirable. A large specific resistance of the composition contributes to a large voltage holding ratio and a large contrast ratio of the device. It is thus desirable that a composition should have a large specific resistance at a high temperature as well as at room temperature in the initial stages. It is desirable that a composition should have a large specific resistance at a high temperature as well as at room temperature, after it has been used for a long period of time. The stability of the composition to UV light and heat relates to the service life of device. A device has a long service life if the stability is high. Such characteristics are desirable for an AM device used for a liquid crystal projector, a liquid crystal television and so forth.

A liquid crystal composition including a polymer is used for a LCD device of a polymer sustained alignment (PSA) type. First, a composition to which a small amount of polymerizable compound has been added is poured into a device. Next, the composition is irradiated with UV light, while a voltage is applied between the substrates of this device, to polymerize the polymerizable compound and form a network structure of a polymer in the composition. In this composition, the polymer makes it possible to adjust the orientation of liquid crystal molecules, and thus the response time of the device is decreased and image burn-in is reduced. Such effect of the polymer can be expected for a device having a mode such as TN, ECB, OCB, IPS, VA, FFS or FPA.

A composition having positive dielectric anisotropy is used for an AM device having a TN mode. A composition having negative dielectric anisotropy is used for an AM device having a VA mode. A composition having positive or negative dielectric anisotropy is used for an AM device having an IPS mode or an FFS mode. A composition having positive or negative dielectric anisotropy is used for an AM device with a PSA type. With regard to the device of a PSA type, examples of the liquid crystal composition having negative dielectric anisotropy are disclosed in the following Patent documents No. 1 to No. 6.

Patent document No. 1: JP 2003-307720 A.
Patent document No. 2: JP 2004-131704 A.
Patent document No. 3: JP 2006-133619 A.
Patent document No. 4: EP 1889894 A.
Patent document No. 5: JP 2010-537010 A.
Patent document No. 6: JP 2010-537256 A.

An improvement of characteristics such as image burn-in is required to a liquid crystal composition, since the performance of a PSA type device has been improved recently. It is considered that a polymerizable compound in which the molecular structure is rod-like has a high ability to orient liquid crystal molecules. In contrast, it has a poor solubility in the composition and a large amount of the polymerizable compound cannot be added. If a polymerizable compound having a high solubility in a liquid crystal composition could be found, it is possible to give a large pretilt angle to liquid crystal molecules, and thus the response time of the device is decreased and image burn-in is reduced.

SUMMARY OF THE INVENTION

Accordingly, the invention provides a liquid crystal composition that includes a polymerizable compound having a high solubility and that satisfies at least one of characteristics such as a high maximum temperature of a nematic phase, a low minimum temperature of a nematic phase, a small viscosity, a suitable optical anisotropy, a large negative dielectric anisotropy, a large specific resistance, a high stability to UV light and a high stability to heat. The invention also provides a liquid crystal composition that is suitably balanced between at least two of the characteristics. The invention further provides a liquid crystal composition that includes a polymer and has characteristics such as a small residual amount of the polymerizable compound and a large pretilt angle, and a AM device that has characteristics such as a small rate of image burn-in, a short response time, a large voltage holding ratio, a low threshold voltage, a large contrast ratio and a long service life.

The invention concerns a liquid crystal composition including at least one polymerizable compound selected form the group of compounds represented by formula (1), and a liquid crystal display device including the liquid crystal composition:

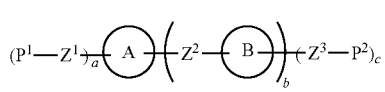

(1)

in formula (1), $P^1$ and $P^2$ are independently a polymerizable group selected from the group of compounds represented by formula (P-1) to formula (P-3):

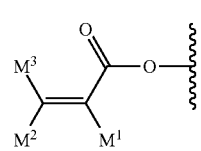

(P-1)

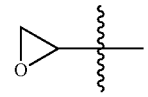

(P-2)

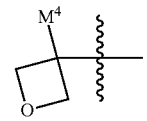

(P-3)

where in formula (P-1), $M^1$, $M^2$ and $M^3$ are independently hydrogen, fluorine, alkyl having 1 to 5 carbons, or alkyl having 1 to 5 carbons in which at least one hydrogen has been replaced by halogen, and in formula (P-3), $M^4$ is hydrogen, methyl, ethyl or propyl; ring A is a bridged ring such as an adamantane ring, a noradamantane ring, a diadamantane ring, a triadamantane ring or a tetraadamantane ring, and in these rings at least one hydrogen may be replaced by halogen or alkyl having 1 to 12 carbons that may contain at least one halogen; ring B is a bridged ring such as an adamantane ring, a noradamantane ring and a diadamantane ring, a cyclohexane ring, a cyclohexene ring, a benzene ring or a naphthalene ring, and in these rings at least one hydrogen may be replaced by halogen or alkyl having 1 to 12 carbons that may contain at least one halogen; $Z^1$ and $Z^3$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH=CH— or —C≡C—; $Z^2$ is a single bond, —COO—, —OCO— or —O—; a is 1, 2 or 3; b is 0, 1, 2 or 3; and c is 1 or 2, and the sum of a and c is 2 to 4.

The liquid crystal composition of the invention includes a polymerizable compound having a high solubility, and may satisfy at least one of characteristics such as a high maximum temperature of a nematic phase, a low minimum temperature of a nematic phase, a small viscosity, a suitable optical anisotropy, a large negative dielectric anisotropy, a large specific resistance, a high stability to UV light and a high stability to heat. The liquid crystal composition may be suitably balanced between at least two of the characteristics. The liquid crystal composition may include a polymer and have characteristics such as a small residual amount of the polymerizable compound and a large pretilt angle, and a AM device containing the composition has characteristics such as a small rate of image burn-in, a short response time, a large voltage holding ratio, a low threshold voltage, a large contrast ratio and a long service life.

EMBODIMENT TO CARRY OUT THE INVENTION

The usage of the terms in the specification and claims is explained as follows. "Liquid crystal composition" and "liquid crystal display device" are sometimes abbreviated to "composition" and "device," respectively. "LCD device" is a generic term for an LCD panel and an LCD module. "Liquid crystal compound" is a generic term for a compound having a liquid crystal phase such as a nematic phase or a smectic phase, and for a compound having no liquid crystal phases but being mixed to a composition to adjust the characteristics, such as the temperature range of a nematic phase, the viscosity and the dielectric anisotropy. This compound has a six-membered ring such as 1,4-cyclohexylene or 1,4-phenylene, and its molecular structure is rod-like. "Polymerizable compound" is a compound that is added to a composition in order to form a polymer in it. Halogen means fluorine, chlorine, bromine or iodine. Desirable halogen is fluorine and chlorine. More desirable halogen is fluorine.

A liquid crystal composition is prepared by mixing a plurality of liquid crystal compounds. The proportion of a liquid crystal compound (content) is expressed as a percentage by weight (wt %) based on the weight of this liquid crystal composition. An additive such as an optically active compound, an antioxidant, an UV light absorbent, a coloring matter, an antifoaming agent, a polymerizable compound, a polymerization initiator or a polymerization inhibitor is added to this liquid crystal composition as required. The proportion of the additive (added amount) is expressed as a weight percentage (wt %) based on the weight of the liquid crystal composition in the same manner as with the liquid crystal compound. Weight parts per million (ppm) is sometimes used. The proportion of the polymerization initiator or the polymerization inhibitor is exceptionally expressed on the basis of the weight of the polymerizable compound.

"The higher limit of the temperature range of a nematic phase" is sometimes abbreviated to "the maximum temperature." "The lower limit of the temperature range of a nematic phase" is sometimes abbreviated to "the minimum temperature." That "specific resistance is large" means that a composition has a large specific resistance at a temperature close to the maximum temperature of a nematic phase as well as at room temperature in the initial stages, and that the composition has a large specific resistance at a temperature close to the maximum temperature of a nematic phase as well as at room temperature, after it has been used for a long time. That "the voltage holding ratio is large" means that a device has a large voltage holding ratio at a temperature close to the maximum temperature of a nematic phase as well as at room temperature in the initial stages, and that the device has a large voltage holding ratio at a temperature close to the maximum temperature of a nematic phase as well as at room temperature, after it has been used for a long time. The expression "increase the dielectric anisotropy" means that its value increases positively when the composition has positive dielectric anisotropy, and that its value increases negatively when the composition has negative dielectric anisotropy.

The expression "at least one 'A'" means that the number of 'A' is arbitrary. The expression "at least one 'A' may be replaced by 'B'" means that the position of 'A' is arbitrary when the number of 'A' is one, and the positions can also be selected without restriction when the number of 'A' is two or more. This also applies to the expression "at least one 'A' has been replaced by 'B'."

In formulae (1) to (4), the symbol such as A, B or L surrounded by a circle or a hexagon corresponds to a ring such as ring A, ring B or ring L, respectively. In compound (4), an oblique line crossing the hexagon of ring L means that arbitrary hydrogen on the ring may be replaced by a $P^3$-$Sp^1$ group. The subscript j means the number of the group that has been replaced. There is no replacement when the subscript j is 0 (zero). Two $P^3$-$Sp^1$ groups are present on ring L when j is 2. Two groups represented by the $P^3$-$Sp^1$ group may be the same or different. The same rule applies to arbitrary two $P^3$-$Sp^1$ groups when j is greater than 2. The same rule applies to other groups. A compound represented by formula (1) is sometimes abbreviated to compound (1). Compound (1) means one compound, a mixture of two compounds or a mixture of three or more compounds represented by formula (1). This applies to a compound represented by another formula.

The symbol for the terminal group, $R^1$, is used for a plurality of compounds in the chemical formulas of component compounds. In these compounds, two groups represented by two arbitrary $R^1$ may be the same or different. In one case, for example, $R^1$ of compound (2) is ethyl and $R^1$ of compound (2-1) is ethyl. In another case, $R^1$ of compound (2) is ethyl and $R^1$ of compound (2-1) is propyl. The same rule applies to symbols such as $R^2$, $R^3$ and $M^1$. In formula (1), two rings B are present when b is 2. In this compound, the two groups represented by the two rings B may be the same or different. This rule applies to arbitrary two rings B, when b is greater than 2. This rule also applies to symbols such as $P^1$, $Z^1$, ring E and $Z^5$.

2-Fluoro-1,4-phenylene means the two divalent groups described below. Fluorine may be facing left (L) or facing right (R) in a chemical formula. The same rule also applies to other asymmetric divalent group derived from a ring, such as tetrahydropyran-2,5-diyl.

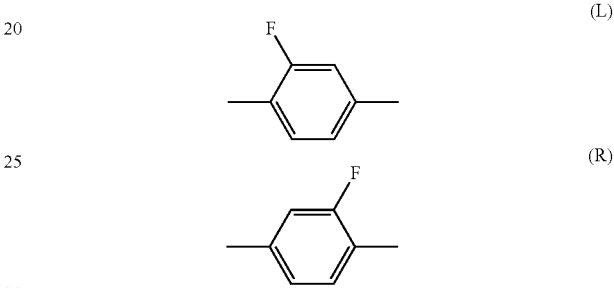

The inventors have found that a combination of compound (1) and a liquid crystal composition is suitable to a device of a PSA type for the following reasons: a) compound (1) has a high solubility in a liquid crystal composition; b) compound (1) polymerizes easily to form a polymer; c) the residual amount of compound (1) is small after polymerization; d) the polymer gives a large pretilt angle to liquid crystal molecules; e) the response time of the device is short; and f) in the device, image burn-in is small.

The invention includes the following items.

Item 1 is a liquid crystal composition including at least one polymerizable compound selected from the group of compounds represented by formula (1):

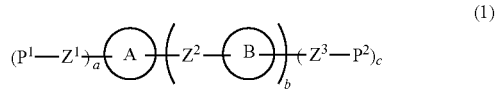

in formula (1), $P^1$ and $P^2$ are independently a polymerizable group selected from the group of groups represented by formula (P-1) to formula (P-3):

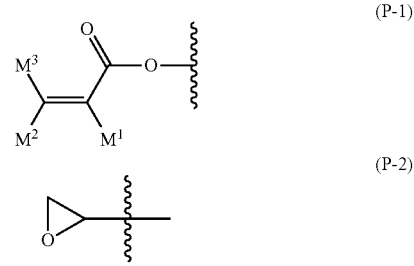

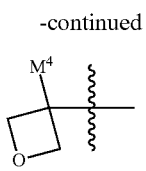

where in formula (P-1), $M^1$, $M^2$ and $M^3$ are independently hydrogen, fluorine, alkyl having 1 to 5 carbons, or alkyl having 1 to 5 carbons in which at least one hydrogen has been replaced by halogen, and in formula (P-3), $M^4$ is hydrogen, methyl, ethyl or propyl; ring A is a bridged ring, and in the ring at least one hydrogen may be replaced by halogen or alkyl having 1 to 12 carbons that may contain at least one halogen; ring B is a bridged ring, a cyclohexane ring, a cyclohexene ring, a benzene ring or a naphthalene ring, and in these rings at least one hydrogen may be replaced by halogen or alkyl having 1 to 12 carbons that may contain at least one halogen; $Z^1$ and $Z^3$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH=CH— or —C≡C—; $Z^2$ is a single bond, —COO—, —OCO— or —O—; a is 1, 2 or 3; b is 0, 1, 2 or 3; c is 1 or 2; and the sum of a and c is 2 to 4.

Item 2 is a liquid crystal composition of item 1 in which in formula (1), $P^1$ and $P^2$ are independently a polymerizable group selected from the group of groups represented by formulae (P-1) to (P-3), where in formula (P-1), $M^1$, $M^2$ and $M^3$ are independently hydrogen, fluorine, alkyl having 1 to 5 carbons, or alkyl having 1 to 5 carbons in which at least one hydrogen has been replaced by halogen, and in formula (P-3), $M^4$ is hydrogen, methyl, ethyl or propyl; ring A is a adamantane ring, a noradamantane ring, a diadamantane ring, a triadamantane ring or a tetraadamantane ring, and in these rings at least one hydrogen may be replaced by halogen or alkyl having 1 to 12 carbons that may contain at least one halogen; ring B is an adamantane ring, a noradamantane ring, a diadamantane ring, a cyclohexane ring, a cyclohexene ring, a benzene ring or a naphthalene ring, and in these rings at least one hydrogen may be replaced by halogen or alkyl having 1 to 12 carbons that may contain at least one halogen; $Z^1$ and $Z^3$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH=CH— or —C≡C—; $Z^2$ is a single bond, —COO—, —OCO— or —O—; a is 1, 2 or 3; b is 0, 1, 2 or 3; c is 1 or 2; and the sum of a and c is 2 to 4.

Item 3 is the liquid crystal composition of item 1 or 2 in which the polymerizable compound is at least one compound selected from the group of compounds represented by formula (1-1):

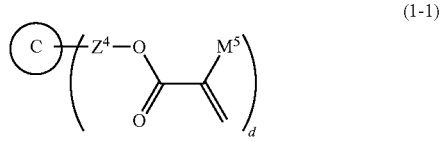

in formula (1-1), ring C is an adamantane ring, a noradamantane ring or a diadamantane ring, and in these rings at least one hydrogen may be replaced by halogen or alkyl having 1 to 6 carbons that may contain at least one halogen; $M^5$ is hydrogen, methyl or trifluoromethyl; $Z^4$ is a single bond or alkylene having 1 to 4 carbons, and in the alkylene at least one —$CH_2$— may be replaced by —O—, —COO—, —OCO— or —OCOO—; and d is 2, 3 or 4.

Item 4 is the liquid crystal composition of any one of items 1 to 3 in which the polymerizable compound is at least one compound selected from the group of compounds represented by formula (1-1-1):

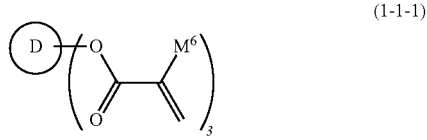

in formula (1-1-1), ring D is an adamantane ring, and in the ring at least one hydrogen may be replaced by halogen or alkyl having 1 to 3 carbons that may contain at least one halogen; and $M^6$ is hydrogen or methyl.

Item 5 is the liquid crystal composition of any one of items 1 to 4 which further includes at least one compound selected from the group of compounds represented by formula (2) as a first component:

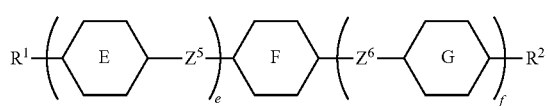

where $R^1$ and $R^2$ are independently alkyl having 1 to 12 carbons, alkoxy having 1 to 12 carbons, alkenyl having 2 to 12 carbons or alkenyloxy having 2 to 12 carbons; ring E and ring G are independently 1,4-cyclohexylene, 1,4-cyclohexenylene, 1,4-phenylene, or 1,4-phenylene in which at least one hydrogen has been replaced by fluorine or chlorine or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl; $Z^5$ and $Z^6$ are independently a single bond, —$CH_2CH_2$—, —$CH_2O$—, —$OCH_2$—, —COO— or —OCO—; e is 1, 2 or 3; f is 0 or 1; and the sum of e and f is 3 or less.

Item 6 is the liquid crystal composition of item 5 in which the first component is at least one compound selected from the group of compounds represented by formula (2-1) to formula (2-19):

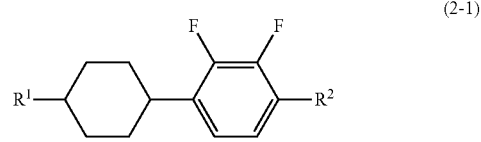

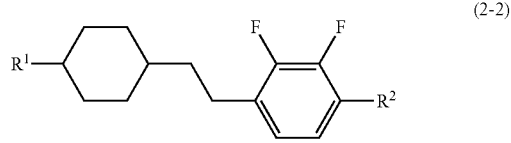

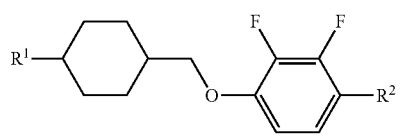
(2-3)

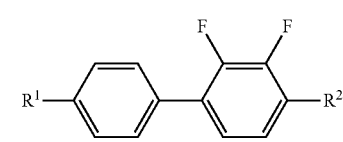
(2-4)

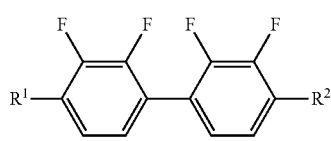
(2-5)

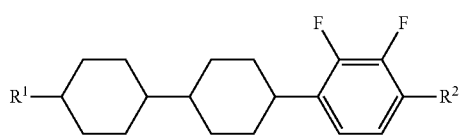
(2-6)

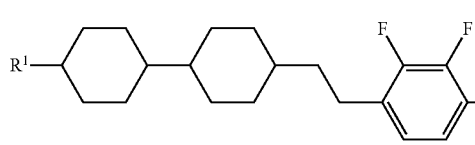
(2-7)

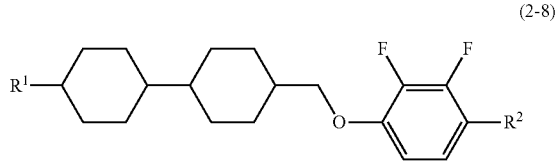
(2-8)

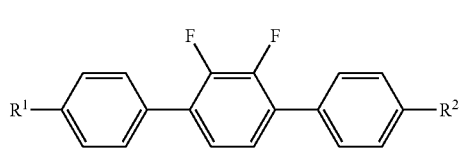
(2-9)

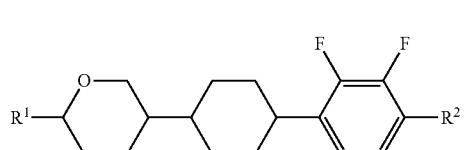
(2-10)

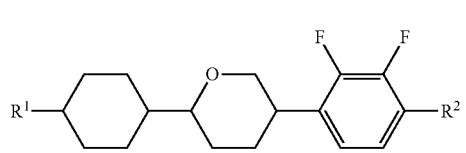
(2-11)

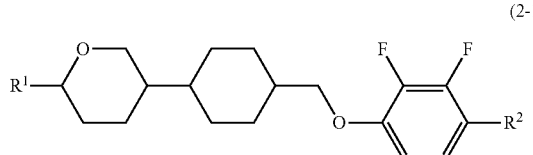
(2-12)

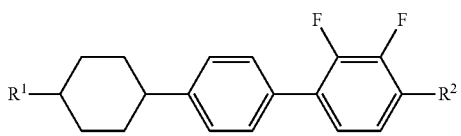
(2-13)

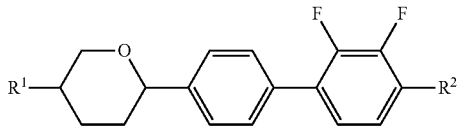
(2-14)

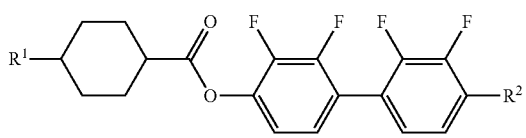
(2-15)

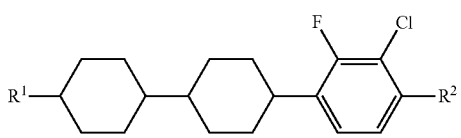
(2-16)

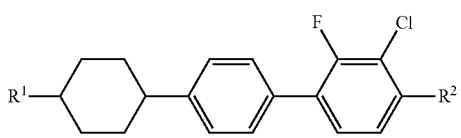
(2-17)

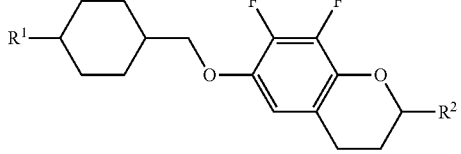
(2-18)

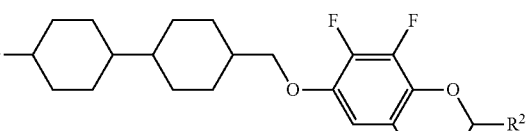
(2-19)

in formula (2-1) to formula (2-19), $R^1$ and $R^2$ are independently alkyl having 1 to 12 carbons, alkoxy having 1 to 12 carbons or alkenyl having 2 to 12 carbons.

Item 7 is the liquid crystal composition of item 5 or 6 in which the proportion of the first component is in the range of 10 wt % to 90 wt % based on the weight of the liquid crystal composition.

Item 8 is the liquid crystal composition of any one of items 1 to 7 which further includes at least one compound selected from the group of compounds represented by formula (3) as a second component:

(3)

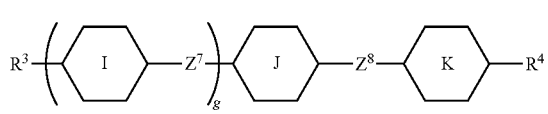

where $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine; ring I, ring J and ring K are independently 1,4-cyclohexylene, 1,4-phenylene or 2-fluoro-1,4-phenylene; $Z^7$ and $Z^8$ are independently a single bond, —CH$_2$CH$_2$—, —CH$_2$O—, —OCH$_2$—, —COO— or —OCO—; and g is 0, 1 or 2.

Item 9 is the liquid crystal composition of item 8 in which the second component is at least one compound selected from the group of compounds represented by formula (3-1) to formula (3-13):

(3-1)
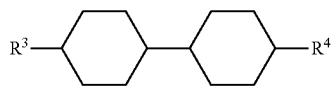

(3-2)
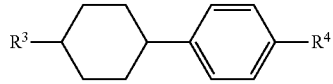

(3-3)
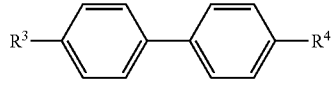

(3-4)
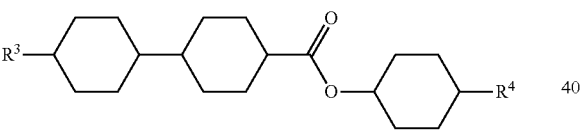

(3-5)
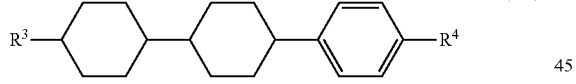

(3-6)
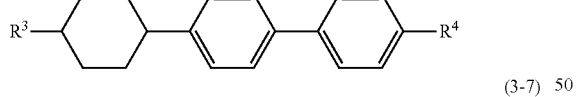

(3-7)
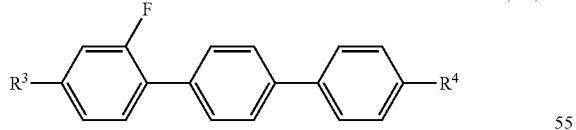

(3-8)
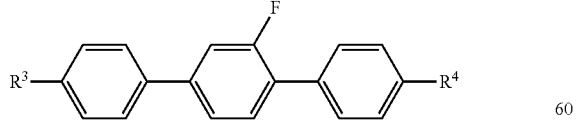

(3-9)
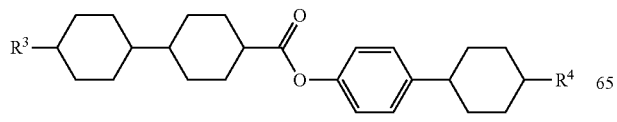

(3-10)
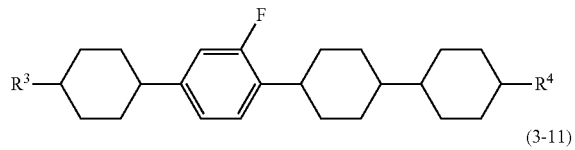

(3-11)
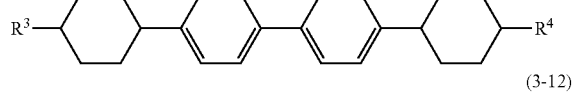

(3-12)
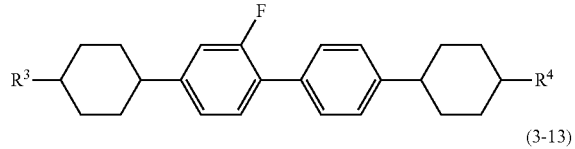

(3-13)
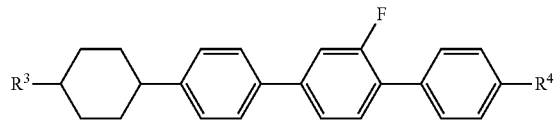

in formula (3-1) to formula (3-13), $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine.

Item 10 is the liquid crystal composition of item 8 or 9 in which the proportion of the second component is in the range of 10 wt % to 90 wt % based on the weight of the liquid crystal composition.

Item 11 is the liquid crystal composition of any one of items 1 to 10 which further includes at least one polymerizable compound selected from the group of compounds represented by formula (4):

(4)
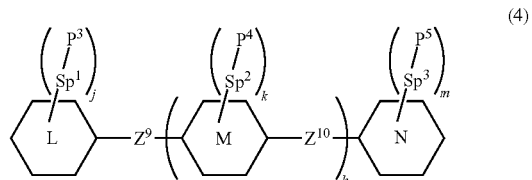

in formula (4), ring L and ring N are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by halogen, alkyl having 1 to 12 carbons, alkoxy having 1 to 12 carbons, or alkyl having 1 to 12 carbons in which at least one hydrogen has been replaced by halogen; ring M is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by halogen, alkyl having 1 to 12 carbons, alkoxy having 1 to 12 carbons, or alkyl having 1 to 12 carbons in which at least one hydrogen has been replaced by halogen; $Z^9$ and $Z^{10}$ are independently a single bond or alkylene having 1 to 10 carbons, and in the alkylene at least one —CH$_2$— may be replaced by —O—, —CO—, —COO— or —OCO—, and at least one —CH$_2$—CH$_2$— may be replaced by —CH=CH—, —C(CH$_3$)=CH—, —CH=C(CH$_3$)— or —C(CH$_3$)=C(CH$_3$)—, and in these groups at least one hydrogen may be replaced by fluorine or chlorine; P$^3$, P$^4$ and P$^5$ are independently a polymerizable group; Sp$^1$, Sp$^2$ and Sp$^3$ are independently a single bond or alkylene having 1 to 10 carbons, and in the alkylene at least one —CH$_2$— may be replaced by —O—, —COO—, —OCO— or —OCOO—, at least one —CH$_2$—CH$_2$— may be replaced by —CH=CH— or —C≡C—, and in these groups at least one hydrogen may be replaced by fluorine or chlorine; h is 0, 1 or 2; j, k and m are independently 0, 1, 2, 3 or 4; and the sum of j, k and m is 1 or more.

Item 12 is the liquid crystal composition of item 11 in which in formula (4), P$^3$, P$^4$ and P$^5$ are independently a polymerizable group selected from the group of groups represented by formula (P-4) to formula (P-9)

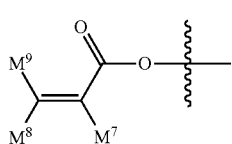  (P-4)

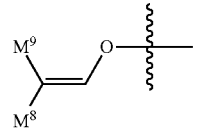  (P-5)

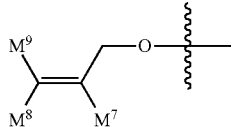  (P-6)

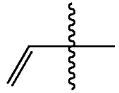  (P-7)

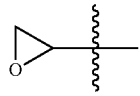  (P-8)

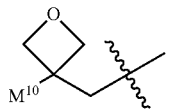  (P-9)

in formula (P-4) to formula (P-9), M$^7$, M$^8$ and M$^9$ are independently hydrogen, fluorine, alkyl having 1 to 5 carbons, or alkyl having 1 to 5 carbons in which at least one hydrogen has been replaced by halogen; in formula (P-9), M$^{10}$ is hydrogen, methyl, ethyl or propyl; and when all of the j-numbering P$^3$ and the m-number P$^5$ are a group represented by formula (P-7), at least one of the j-numbering and the m-numbering Sp$^3$ is alkylene in which at least one —CH$_2$— has been replaced by —O—, —COO—, —OCO— or —OCOO—.

Item 13 is the liquid crystal composition of item 11 or 12 in which the polymerizable compound is at least one compound selected from the group of compounds represented by formulae (4-1) to (4-27):

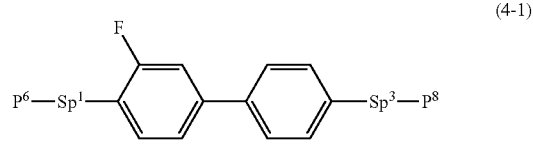  (4-1)

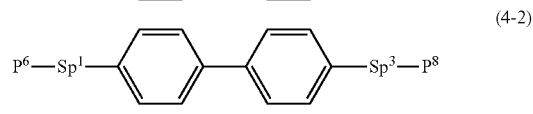  (4-2)

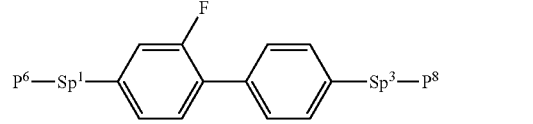  (4-3)

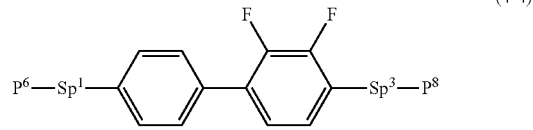  (4-4)

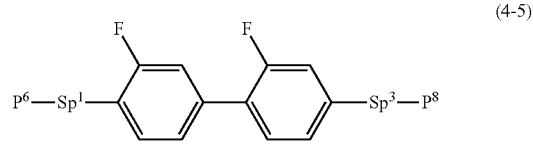  (4-5)

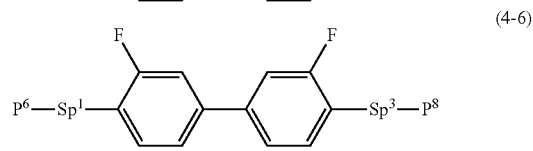  (4-6)

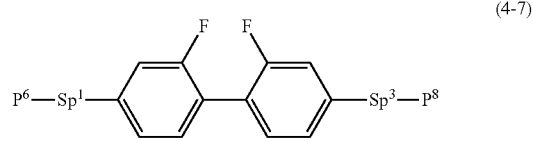  (4-7)

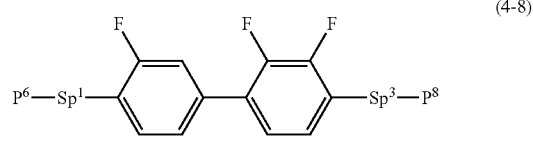  (4-8)

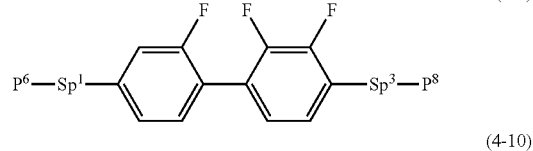  (4-9)

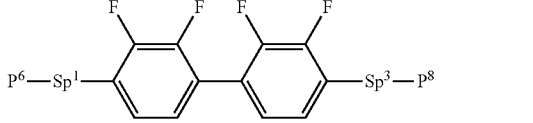  (4-10)

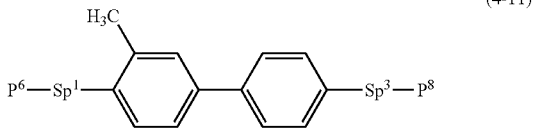  (4-11)

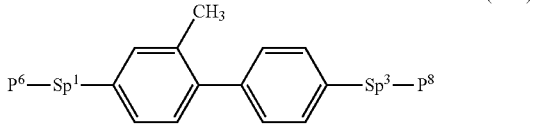  (4-12)

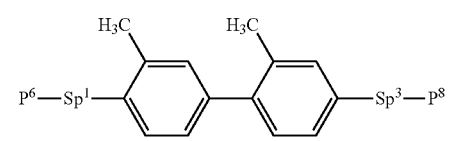
(4-13)
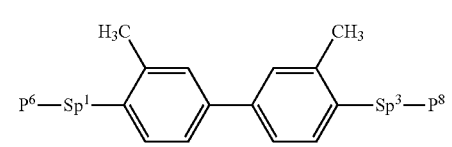
(4-14)
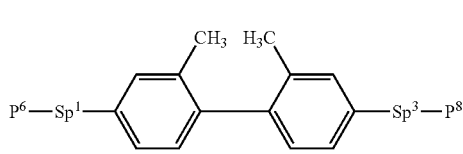
(4-15)
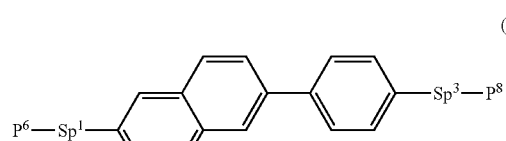
(4-16)
(4-17)
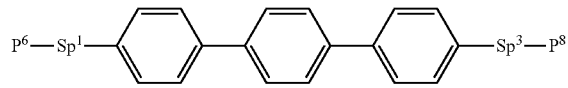
(4-18)
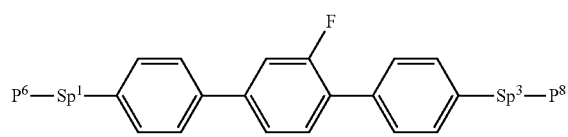
(4-19)
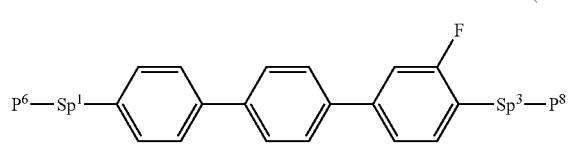
(4-20)
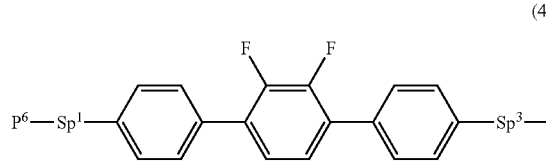
(4-21)
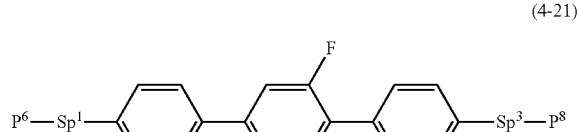
(4-22)
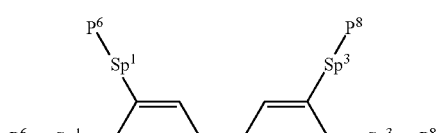
(4-23)
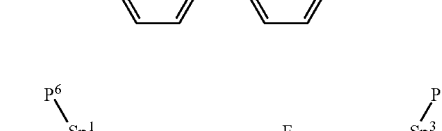
(4-24)
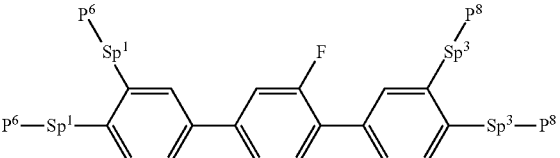
(4-25)
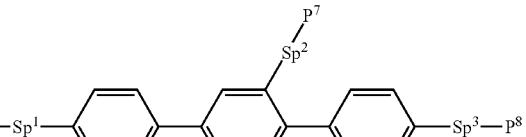
(4-26)
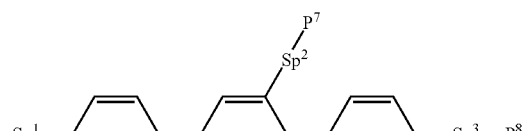
(4-27)
in formula (4-1) to formula (4-27), $P^6$, $P^7$ and $P^8$ are independently a polymerizable group selected from the group of groups represented by formula (P-4) to formula (P-6):
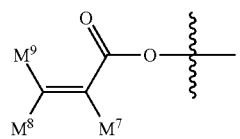
(P-4)
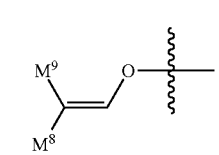
(P-5)

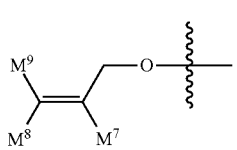

(P-6)

where in formulae (P-4) to (P-6), $M^7$, $M^8$ and $M^9$ are independently hydrogen, fluorine, alkyl having 1 to 5 carbons, or alkyl having 1 to 5 carbons in which at least one hydrogen has been replaced by halogen; and $Sp^1$, $Sp^2$ and $Sp^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH═CH— or —C≡C—, and in these groups at least one hydrogen may be replaced by fluorine or chlorine.

Item 14 is the liquid crystal composition of any one of items 1 to 13 in which the proportion of the at least one polymerizable compound represented by formula (1) is in the range of 0.03 wt % to 10 wt % based on the weight of the liquid crystal composition.

Item 15 is the liquid crystal composition of any one of items 11 to 13 in which the proportion of the total amount of the polymerizable compound represented by formula (1) and the polymerizable compound represented by formula (4) is in the range of 0.03 wt % to 10 wt % based on the weight of the liquid crystal composition.

Item 16 is an LCD device including the liquid crystal composition of any one of items 1 to 15.

Item 17 is the LCD device of item 16 of which the operating mode is an IPS mode, a VA mode, an FFS mode or an FPA mode, and the driving mode is an active matrix mode.

Item 18 is a liquid crystal display device of a polymer sustained alignment (PSA) type, which includes the liquid crystal composition of any one of items 1 to 15 in which the polymerizable compound has been polymerized.

Item 19 is use of the liquid crystal composition of any one of items 1 to 15 for an LCD device.

Item 20 is use of the liquid crystal composition of any one of items 1 to 15 for an LCD device of a PSA type.

The invention also includes the following items: a) a method for producing the LCD device, in which the liquid crystal composition described above is arranged between two substrates and is irradiated with light while a voltage is applied to polymerize a polymerizable compound included in the composition; and b) the liquid crystal composition described above in which the maximum temperature of a nematic phase is 70° C. or higher, and the optical anisotropy (measured at 25° C.) at a wavelength of 589 nm is 0.08 or more, and the dielectric anisotropy (measured at 25° C.) at a frequency of 1 kHz is −2 or less.

The invention also includes the following items: c) the composition described above which includes at least one compound selected from the group of compounds (5) to (7) disclosed in JP 2006-199941 A that are all liquid crystal compounds having positive dielectric anisotropy; d) the composition described above which includes polymerizable compound (1) described above; e) the composition described above which includes polymerizable compounds (1) and (4) described above; f) the composition described above which includes a polymerizable compound that is different from polymerizable compound (1) or (4); g) the composition described above which includes at least one of additives such as an optically active compound, an antioxidant, an UV light absorbent, a coloring matter, an antifoaming agent, a polymerizable compound, a polymerization initiator and a polymerization inhibitor; h) an AM device including the composition described above; i) a device including the composition described above and having a mode of TN, ECB, OCB, IPS, FFS, VA or FPA; j) a transmission-type device including the composition described above; k) use of the composition described above, as a composition having a nematic phase; and l) use of the composition as an optically active composition by adding an optically active compound to the composition described above.

The composition of the invention will be explained in the following order. First, the constitution of component compounds in the composition is explained. Second, the main characteristics of the component compounds and the main effects of these compounds on the composition are explained. Third, the combination of the components in the composition, desirable proportions of the components and their bases are explained. Fourth, desirable embodiments of the component compounds are explained. Fifth, desirable component compounds are shown. Sixth, additives that may be added to the composition are explained. Seventh, methods for synthesizing the component compounds are explained. Last, the use of the composition is explained.

First, the constitution of component compounds in the composition is explained. The compositions of the invention are classified into composition A and composition B. Composition A may further include any other liquid crystal compound, an additive and so forth, in addition to liquid crystal compounds selected from compounds (2) and (3). "Any other liquid crystal compound" is a liquid crystal compound different from compounds (2) and (3). Such a compound is mixed with the composition for further adjusting the characteristics. Among other liquid crystal compounds, a smaller amount of a cyano compound is desirable in view of its stability to heat or UV light. A more desirable ratio of the cyano compound is 0 wt %. The additive includes an optically active compound, an antioxidant, a UV light absorbent, a coloring matter, an antifoaming agent, a polymerizable compound, a polymerization initiator and a polymerization inhibitor.

Composition B consists essentially of liquid crystal compounds selected from compounds (2) and (3). The term "essentially" means that the composition may include an additive, but does not include any other liquid crystal compound. Composition B has a smaller number of components than composition A, and is preferred to composition A in view of cost reduction. Composition A is preferred to composition B in view of the fact that characteristics can be further adjusted by mixing with any other liquid crystal compound.

Second, the main characteristics of the component compounds and the main effects of these compounds on the characteristics of the composition are explained. Table 2 summarizes the main characteristics of the component compounds based on the effects of the invention. In Table 2, the symbol L stands for "large" or "high", the symbol M stands for "medium", and the symbol S stands for "small" or "low." The symbols L, M and S mean a classification based on a qualitative comparison among the component compounds, and the symbol 0 means that the value is zero or close to zero.

TABLE 2

| Characteristics of Compounds | | |
| Compound | Compound (2) | Compound (3) |
| --- | --- | --- |
| Maximum Temperature | S-M | S-L |
| Viscosity | M-L | S-M |

TABLE 2-continued

Characteristics of Compounds

| Compound | Compound (2) | Compound (3) |
|---|---|---|
| Optical Anisotropy | M-L | S-L |
| Dielectric Anisotropy | M-L[1)] | 0 |
| Specific Resistance | L | L |

[1)]The value of the dielectric anisotropy is negative, and the symbol expresses the magnitude of the absolute value.

The main effects of the component compounds on the characteristics of the composition upon mixing the component compounds with the composition are as follows. Compounds (1) and (4) give a polymer by polymerization. The polymer decreases the response time of the device, and reduces image burn-in. Compound (2) increases the dielectric anisotropy and decreases the minimum temperature. Compound (3) decreases the viscosity or increases the maximum temperature or decreases the minimum temperature.

Third, the combination of the components in the composition, desirable proportions of the components and their bases are explained. The combination of the components in the composition is compound (1) plus compound (2), compound (1) plus compound (3), compound (1) plus compound (2) plus compound (3), compound (1) plus compound (2) plus compound (4), or compound (1) plus compound (2) plus compound (3) plus compound (4). A more desirable combination is compound (1) plus compound (2) plus compound (3) or compound (1) plus compound (2) plus compound (3) plus compound (4).

A polymerizable compound such as compound (1) and compound (4) is added to the composition for adjusting to device of a PSA type. A desirable proportion of the polymerizable compound is about 0.03 wt % or more for orienting liquid crystal molecules, and about 10 wt % or less for preventing a poor display of a device. A more desirable proportion is in the range of about 0.1 wt % to about 2 wt %. An especially desirable proportion is in the range of about 0.2 wt % to about 1 wt %.

A desirable proportion of compound (2) is about 10 wt % or more for increasing the dielectric anisotropy and about 90 wt % or less for decreasing the viscosity. A more desirable proportion is in the range of about 20 wt % to about 80 wt %. An especially desirable proportion is in the range of about 30 wt % to about 70 wt %.

A desirable proportion of compound (3) is about 10 wt % or more for increasing the maximum temperature or for decreasing the viscosity, and about 90 wt % or less for decreasing the minimum temperature. A more desirable proportion is in the range of about 20 wt % to about 80 wt %. An especially desirable proportion is in the range of about 30 wt % to about 70 wt %.

Fourth, desirable embodiments of the component compounds are explained. Compound (1) is characterized in having a bridged ring structure in which steric hindrance is large, as a main skeleton. The main skeleton of the bridged ring may contain a fused ring structure and a spiro-ring structure. The bridged ring means one that has a skeleton with a plurality of rings and has three or more shared atoms between two rings. The fused ring means one that has a skeleton with a plurality of rings and has two shared atoms between two rings. The spiro-ring means one that has a skeleton with a plurality of rings and has one shared atom between two rings. It is desirable that the bridged ring should be a bicyclo ring, a tricyclo ring or a tetracyclo ring for increasing the polymerizability. Here, for the meanings of the bicyclo ring, the tricyclo ring and the tetracyclo ring, the number of bond breakings between the ring atoms required for giving a chain structure is two for the bicyclo ring, three for the tricyclo ring, and four for tetracyclo ring. The species of the atoms forming a ring within the structure is not limited, and the ring is preferably composed of carbon or of oxygen and carbon, and more preferably composed of carbon. The ring structure has preferably 6 to 21 carbons, and more preferably 7 to 18 carbons.

In formula (1), $P^1$ and $P^2$ are independently a polymerizable group selected from the group of groups represented by formula (P-1) to formula (P-3). Desirable $P^1$ or $P^2$ is group (P-1) for increasing the reactivity or for decreasing the response time. A wavy line in group (P-1) to group (P-3) indicates a binding site.

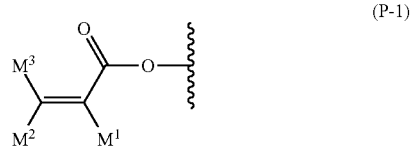

(P-1)

(P-2)

(P-3)

$M^1$ (or $M^2$ or $M^3$) in $P^1$ and $M^1$ (or $M^2$ or $M^3$) in $P^2$ may be the same or different when $P^1$ and $P^2$ is group (P-1). In group (P-1), $M^1$, $M^2$ and $M^3$ are independently hydrogen, fluorine, alkyl having 1 to 5 carbons, or alkyl having 1 to 5 carbons in which at least one hydrogen has been replaced by halogen. Desirable $M^1$, $M^2$ or $M^3$ is hydrogen or methyl for increasing the reactivity. More desirable $M^1$ is methyl, and more desirable $M^2$ or $M^3$ is hydrogen. In group (P-3), $M^4$ is hydrogen, methyl, ethyl or propyl. Desirable $M^4$ is methyl or ethyl for increasing the reactivity. In formula (1-1), $M^5$ is hydrogen, methyl or —$CF_3$. Desirable $M^5$ is hydrogen or methyl for increasing the reactivity. In formula (1-1-1), $M^6$ is hydrogen or methyl. Desirable $M^6$ is methyl for increasing the reactivity.

In formula (4), $P^3$, $P^4$ and $P^5$ are independently a polymerizable group. Desirable $P^3$, $P^4$ or $P^5$ is a polymerizable group selected from the group of groups represented by formulae (P-4) to (P-9). Desirable $P^3$, $P^4$ or $P^5$ is group (P-4) or group (P-5). More desirable group (P-4) is —OCO—CH=$CH_2$ or —OCO—C($CH_3$)=$CH_2$. A wavy line in group (P-4) to group (P-9) indicates a binding site.

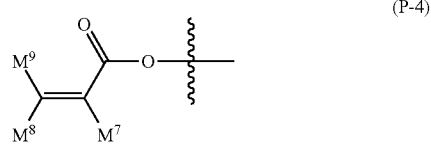

(P-4)

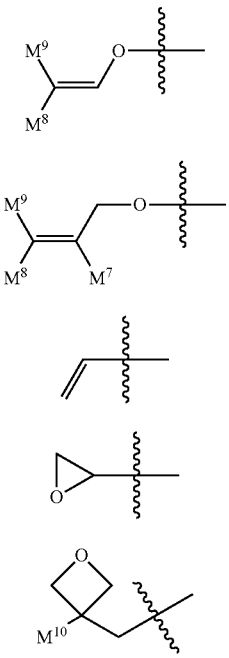

(P-5)

(P-6)

(P-7)

(P-8)

(P-9)

$M^7$ (or $M^8$ or $M^9$) in $P^3$ and $M^7$ (or $M^8$ or $M^9$) in $P^4$ and $M^7$ (or $M^8$ or $M^9$) in $P^5$ may be the same or different when $P^3$, $P^4$ and $P^5$ are all group (P-4). In group (P-4), $M^7$, $M^8$ and $M^9$ are independently hydrogen, fluorine, alkyl having 1 to 5 carbons, or alkyl having 1 to 5 carbons in which at least one hydrogen has been replaced by halogen. Desirable $M^7$, $M^8$ or $M^9$ is hydrogen or methyl for increasing the reactivity. More desirable $M^7$ is methyl, and more desirable $M^8$ or $M^9$ is hydrogen.

When both $P^3$ and $P^5$ are group (P-7), at least one of $Sp^1$ and $Sp^3$ is alkylene in which at least one —CH$_2$— has been replaced by —O—, —COO—, —OCO— or —OCOO—. That is to say, both $P^3$ and $P^5$ are not alkenyl such as 1-propenyl simultaneously.

When $P^3$, $P^4$ and $P^5$ are all group (P-9), $M^{10}$ in $P^3$ and $M^{10}$ in $P^4$ and $M^{10}$ in $P^5$ may be the same or different. In group (P-9), $M^{10}$ is hydrogen, methyl, ethyl or propyl. Desirable $M^{10}$ is methyl or ethyl for increasing the reactivity.

In formulae (4-1) to (4-27), $P^6$, $P^7$ and $P^8$ are independently a polymerizable group selected from the group of groups represented by formulae (P-4) to (P-6). Desirable $P^6$, $P^7$ or $P^8$ is group (P-4) or (P-5). More desirable (P-4) is —OCO—CH═CH$_2$ or —OCO—C(CH$_3$)═CH$_2$. A wavy line in groups (P-4) to (P-6) indicates a binding site.

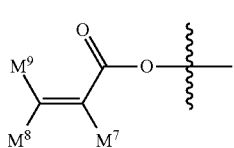

(P-4)

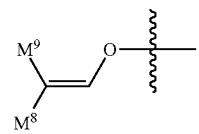

(P-5)

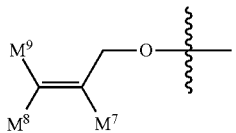

(P-6)

When $P^6$, $P^7$ and $P^8$ are all group (P-4), $M^7$ (or $M^8$ or $M^9$) in $P^6$ and $M^7$ (or $M^8$ or $M^9$) in $P^7$ and $M^7$ (or $M^8$ or $M^9$) in $P^8$ may be the same of different.

$Sp^1$, $Sp^2$ and $Sp^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH═CH— or —C≡C—, and in these groups at least one hydrogen may be replaced by fluorine or chlorine. Desirable $Sp^1$, $Sp^2$ or $Sp^3$ is a single bond.

In formula (1), ring A is a bridged ring such as an adamantane ring, a noradamantane ring, a diadamantane ring, a triadamantane ring and a tetraadamantane ring, and in these rings at least one hydrogen may be replaced by halogen or alkyl having 1 to 12 carbons that may contain at least one halogen. In the accurate expression, ring A means a group with valence (a+1) derived from one of these rings, where a is the subscript described in item 1. Desirable ring A is an adamantane ring in which at least one hydrogen may be replaced by halogen or methyl for increasing the reactivity. Ring B is a bridged ring such as an adamantane ring, a noradamantane ring and a diadamantane ring, a cyclohexane ring, a cyclohexene ring, a benzene ring or a naphthalene ring, and in these rings at least one hydrogen may be replaced by halogen or alkyl having 1 to 12 carbons that may contain at least one halogen. In the accurate expression, ring B means a divalent group derived from one of these rings. Desirable ring B is an adamantane ring in which at least one hydrogen may be replaced by halogen or methyl, a benzene ring or a naphthalene ring for increasing the reactivity or for increasing the solubility.

In formula (1-1), ring C is an adamantane ring, a noradamantane ring or a diadamantane ring, and in these rings at least one hydrogen may be replaced by halogen or alkyl having 1 to 6 carbons that may contain at least one halogen. Desirable ring C is an adamantane ring for increasing the reactivity. Ring D is an adamantane ring, and in the ring, at least one hydrogen may be replaced by halogen or alkyl having 1 to 3 carbons that may contain at least one halogen.

In formula (4), ring L and ring N are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by halogen, alkyl having 1 to 12 carbons, alkoxy having 1 to 12 carbons, or alkyl having 1 to 12 carbons in which at least one hydrogen has been replaced by halogen. Desirable ring L or ring N is phenyl. Ring M is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by halogen, alkyl having 1 to 12 carbons, alkoxy having 1 to 12 carbons, or alkyl having 1 to 12 carbons in which at least one hydrogen has been replaced by halogen. Especially desirable ring M is 1,4-phenylene or 2-fluoro-1,4-phenylene.

In formula (1), $Z^1$ and $Z^3$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH=CH— or —C≡C—. Desirable $Z^1$ or $Z^3$ is a single bond or alkylene having 1 to 4 carbons for increasing the reactivity. More desirable $Z^1$ or $Z^3$ is a single bond or alkylene having 1 or 2 carbons. $Z^2$ is a single bond, —COO—, —OCO— or —O—. Desirable $Z^2$ is a single bond for increasing the reactivity. In formula (1-1), $Z^4$ is alkylene having 1 to 4 carbons in which at least one —$CH_2$— may be replaced by —O—, —COO—, —OCO— or —OCOO—. Desirable $Z^4$ is a single bond or alkylene having 1 or 2 carbons.

In formula (4), $Z^9$ and $Z^{10}$ are independently a single bond or alkylene having 1 to 10 carbons in which at least one —$CH_2$— may be replaced by —O—, —CO—, —COO— or —OCO— and at least one —$CH_2$—$CH_2$— may be replaced by —CH=CH—, —C($CH_3$)=CH—, —CH=C($CH_3$)— or —C($CH_3$)=C($CH_3$)—, and in these groups at least one hydrogen may be replaced by fluorine or chlorine. Desirable $Z^9$ or $Z^{10}$ is a single bond, —$CH_2CH_2$—, —$CH_2O$—, —$OCH_2$—, —COO— or —OCO—. More desirable $Z^9$ or $Z^{10}$ is a single bond.

In formula (1), a is 1, 2 or 3, c is 1 or 2, and the sum of a and c is 2 to 4. Preferably, a is 1 or 2, c is 1 or 2, and the sum of a and c is 2 or 3 for increasing the reactivity. b is 0, 1, 2 or 3. Desirable b is 0 or 1 for increasing the reactivity. More desirable b is 0. In formula (1-1), d is 2, 3 or 4. Desirable d is 2 for increasing the reactivity.

In formula (4), h is 0, 1 or 2. Desirable h is 0 or 1. j, k and m are independently 0, 1, 2, 3 or 4, and the sum of j, k and m is 1 or more. Desirable j, k or m is 1 or 2.

In formula (2), $R^1$ and $R^2$ are independently alkyl having 1 to 12 carbons, alkoxy having 1 to 12 carbons, alkenyl having 2 to 12 carbons or alkenyloxy having 2 to 12 carbons. Desirable $R^1$ or $R^2$ is alkyl having 1 to 12 carbons for increasing the stability to UV light or heat, or is alkoxy having 1 to 12 carbons for decreasing the viscosity or for increasing the dielectric anisotropy.

In formula (3), $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine. Desirable $R^3$ or $R^4$ is alkenyl having 2 to 12 carbons for decreasing the viscosity, or is alkyl having 1 to 12 carbons for increasing the stability to UV light or for increasing the stability to heat.

Desirable alkyl is methyl, ethyl, propyl, butyl, pentyl, hexyl, heptyl or octyl. More desirable alkyl is ethyl, propyl, butyl, pentyl or heptyl for decreasing the viscosity.

Desirable alkoxy is methoxy, ethoxy, propoxy, butoxy, pentyloxy, hexyloxy or heptyloxy. More desirable alkoxy is methoxy or ethoxy for decreasing the viscosity.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. More desirable alkenyl is vinyl, 1-propenyl, 3-butenyl or 3-pentenyl for decreasing the viscosity. The desirable configuration of —CH=CH— in the alkenyl depends on the position of the double bond. Trans is preferable in the alkenyl such as 1-propenyl, 1-butenyl, 1-pentenyl, 1-hexenyl, 3-pentenyl and 3-hexenyl for decreasing the viscosity. Cis is preferable in the alkenyl such as 2-butenyl, 2-pentenyl and 2-hexenyl.

Desirable alkenyloxy is vinyloxy, allyloxy, 3-butenyloxy, 3-pentenyloxy or 4-pentenyloxy. More desirable alkenyloxy is allyloxy or 3-butenyloxy for decreasing the viscosity.

Desirable examples of alkenyl in which at least one hydrogen has been replaced by fluorine are 2,2-difluorovinyl, 3,3-difluoro-2-propenyl, 4,4-difluoro-3-butenyl, 5,5-difluoro-4-pentenyl or 6,6-difluoro-5-hexenyl. More desirable examples are 2,2-difluorovinyl or 4,4-difluoro-3-butenyl for decreasing the viscosity.

Alkyl is straight or branched, and does not include cycloalkyl. Straight alkyl is preferred to branched alkyl. This applies to a terminal group such as alkoxy, alkenyl, alkenyloxy, and alkenyl in which at least one hydrogen has been replaced by fluorine. With regard to the configuration of 1,4-cyclohexylene, trans is preferred to cis for increasing the maximum temperature.

In formula (2), ring E and ring G are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl, and arbitrary two rings E may be the same or different when e is 2 or 3. Desirable ring E or ring G is 1,4-cyclohexylene for decreasing the viscosity, or is 1,4-phenylene for increasing the optical anisotropy. Tetrahydropyran-2,5-diyl is

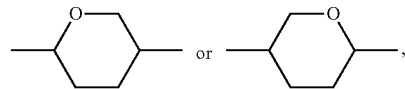

preferably

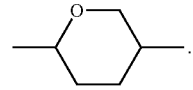

In formula (2), ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl or 7,8-difluorochroman-2,6-diyl. Desirable ring F is 2,3-difluoro-1,4-phenylene for decreasing the viscosity, or is 2-chloro-3-fluoro-1,4-phenylene for decreasing the optical anisotropy, or is 7,8-difluorochroman-2,6-diyl for increasing the dielectric anisotropy.

In formula (3), ring I, ring J and ring K are independently 1,4-cyclohexylene, 1,4-phenylene or 2-fluoro-1,4-phenylene, and two rings I may be the same of different when g is 2. Desirable ring I, ring J or ring K is 1,4-cyclohexylene for decreasing the viscosity or for increasing the maximum temperature, or is 1,4-phenylene for decreasing the minimum temperature.

In formula (2) or formula (3), $Z^5$, $Z^6$, $Z^7$ and $Z^8$ are independently a single bond, —$CH_2CH_2$—, —$CH_2O$—, —$OCH_2$—, —COO— or —OCO—, and arbitrary two $Z^5$ may be the same or different when e is 2 or 3, and two $Z^7$ may be the same of different when g is 2. Desirable $Z^5$, $Z^6$, $Z^7$ or $Z^8$ is a single bond for decreasing the viscosity, or is —$CH_2CH_2$— for decreasing the minimum temperature, or is —$CH_2O$— f or increasing the dielectric anisotropy.

In formula (2), e is 1, 2 or 3. Desirable e is 1 for decreasing the viscosity, or is 2 or 3 for increasing the maximum temperature. f is 0 or 1. Desirable f is 0 for decreasing the viscosity, or is 1 for decreasing the minimum temperature. In formula (3), g is 0, 1 or 2. Desirable g is 0 for decreasing the viscosity, or is 1 or 2 for increasing the maximum temperature.
Fifth, desirable component compounds are shown. Desirable compounds (1) are not particularly limited and include, for example, compounds (1-1-1-1) to (1-1-1-4), compounds (1-1-2-1) to (1-1-2-8), compounds (1-1-3-1) to (1-1-3-3), compounds (1-1-4-1) to (1-1-4-6) and compounds (1-1-5-1) to (1-1-5-8).
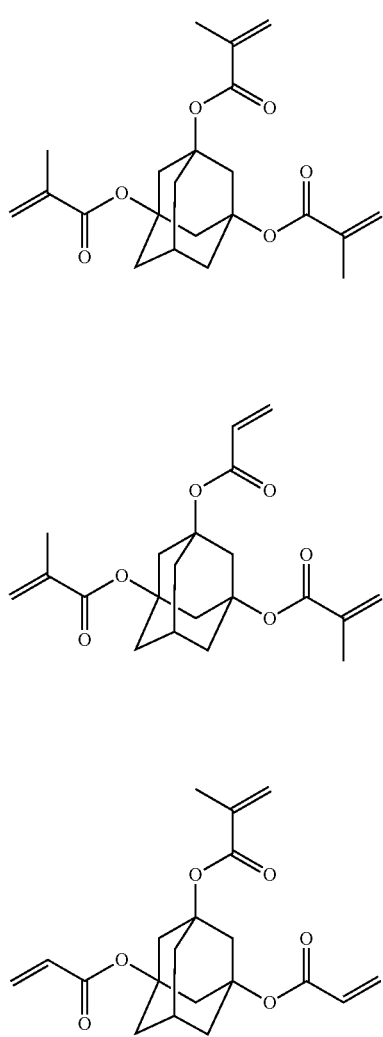
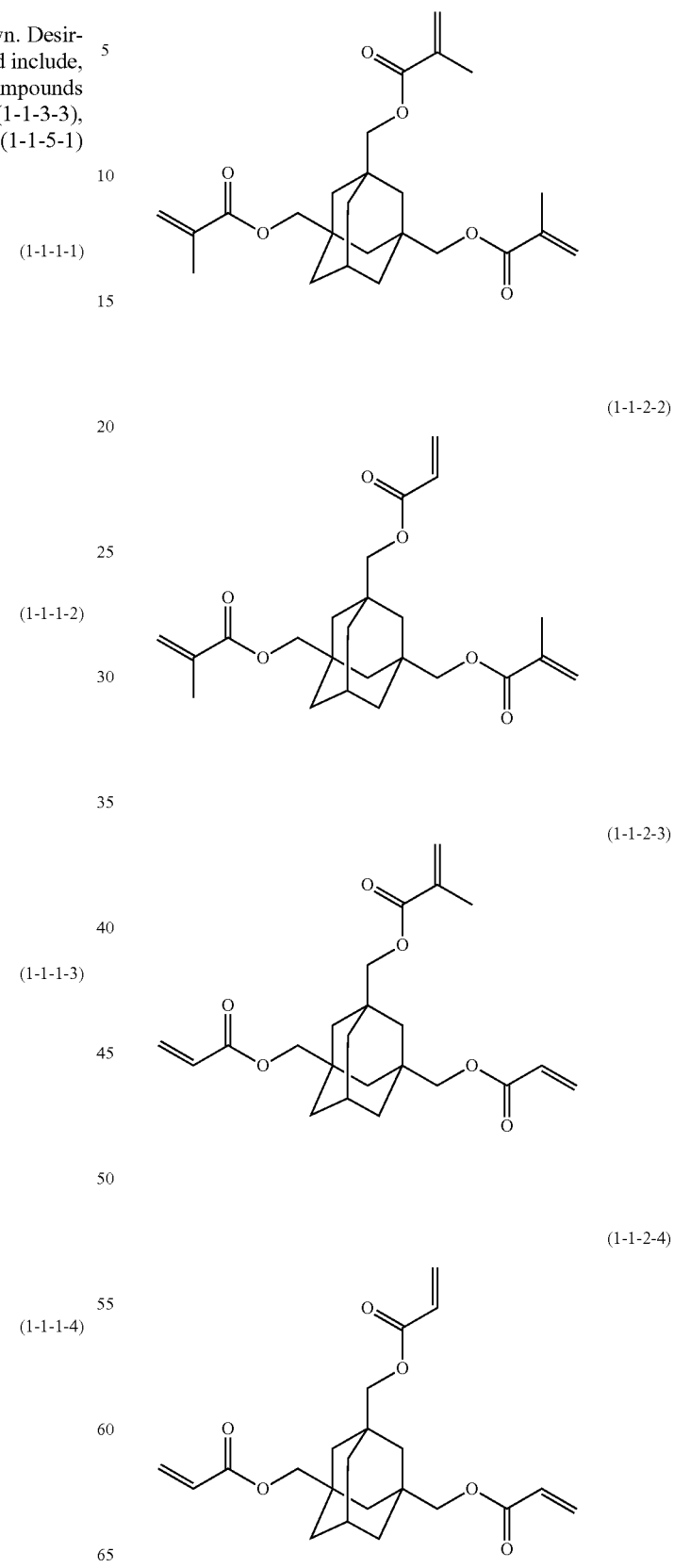

27
-continued
(1-1-2-5)
(1-1-2-6)
(1-1-2-7)
(1-1-2-8)
(1-1-3-1)
(1-1-3-2)
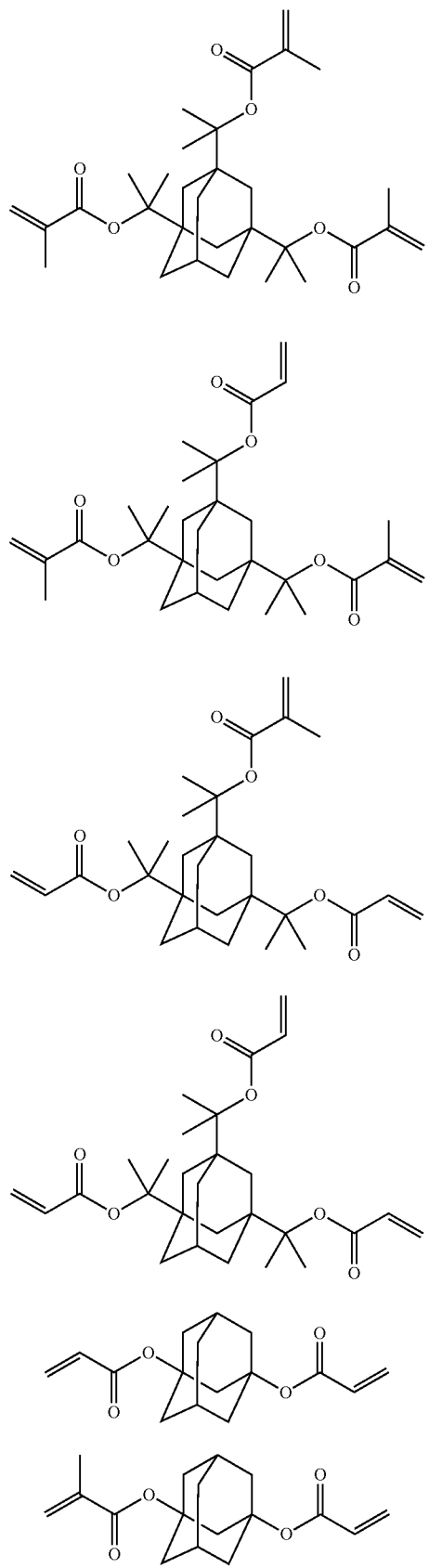
28
-continued
(1-1-3-3)
(1-1-4-1)
(1-1-4-2)
(1-1-4-3)
(1-1-4-4)
(1-1-4-5)
(1-1-4-6)
(1-1-5-1)
(1-1-5-2)
(1-1-5-3)
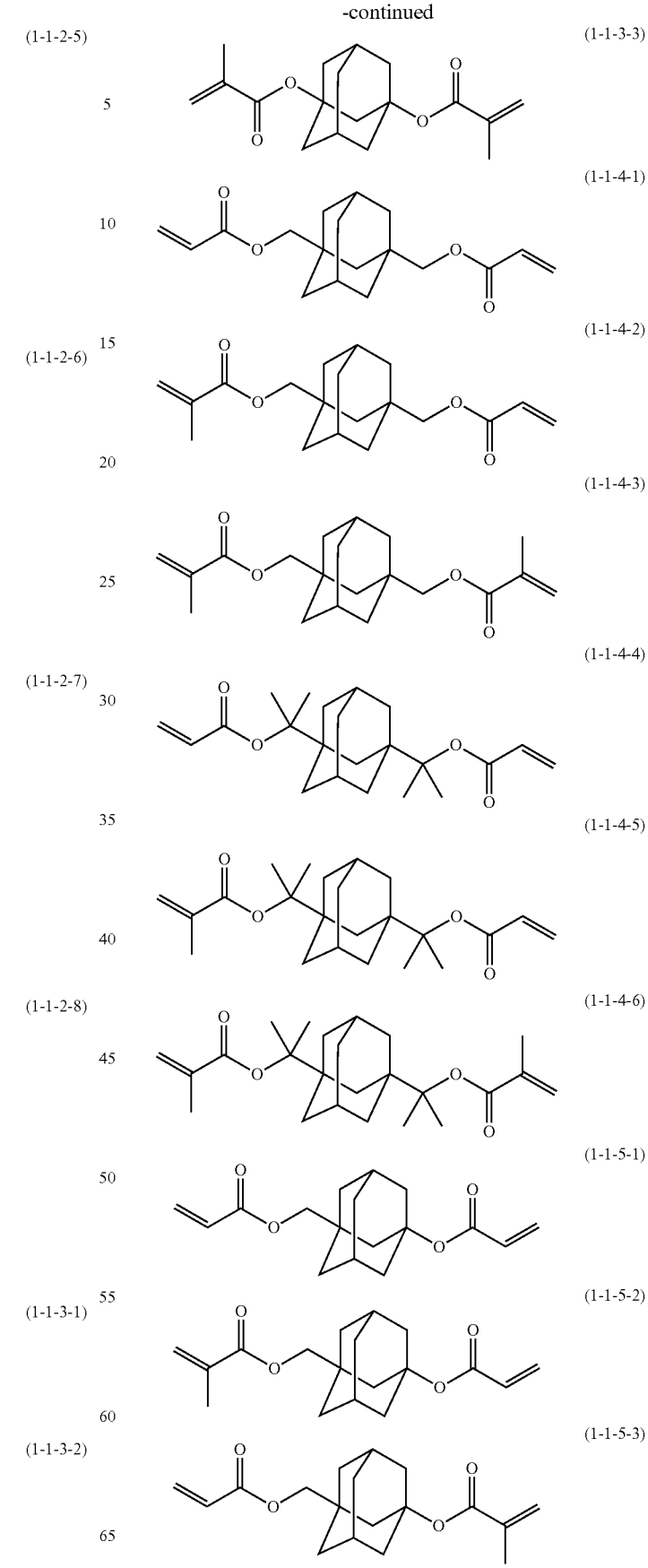

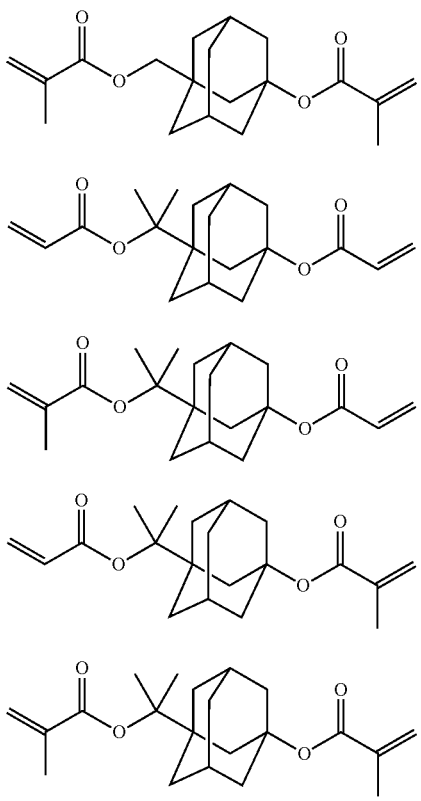

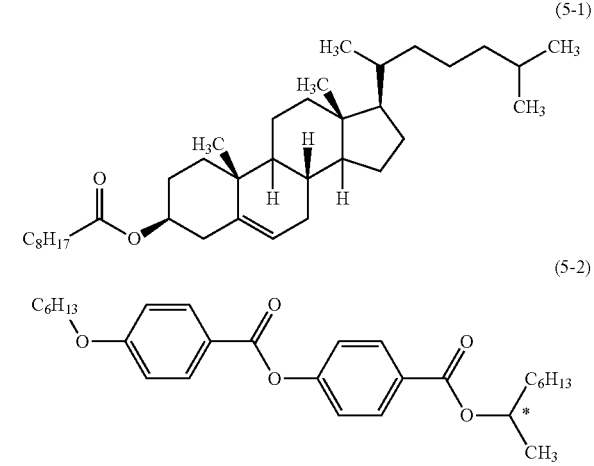

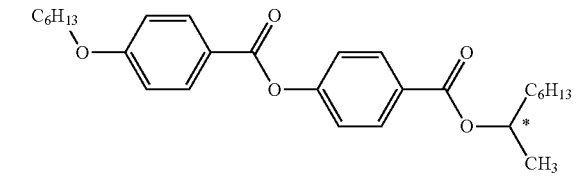

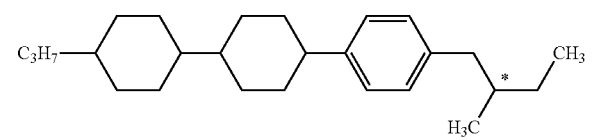

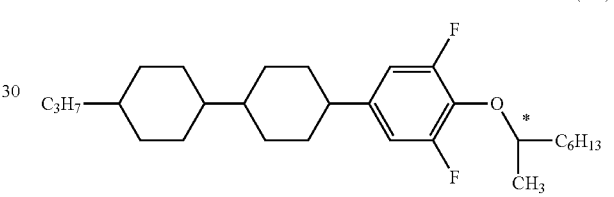

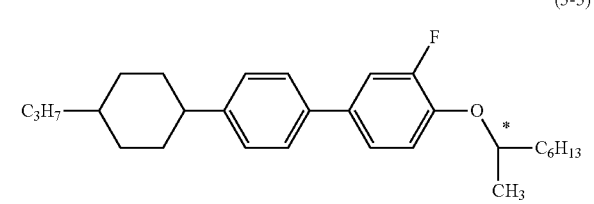

Desirable compounds (2) are compounds (2-1) to (2-19) described in item 6. It is desirable that in these compounds, at least one of the first component should be compound (2-1), (2-3), (2-4), (2-6), (2-8) or (2-13). It is desirable that at least two of the first component should be a combination of compounds (2-1) and (2-6), compounds (2-1) and (2-13), compounds (2-3) and (2-6), compounds (2-3) and (2-13) or compounds (2-4) and (2-8).

Desirable compounds (3) are compounds (3-1) to (3-13) described in item 9. It is desirable that in these compounds, at least one of the second component should be compound (3-1), (3-3), (3-5), (3-6), (3-7) or (3-8). It is desirable that at least two of the second component should be a combination of compounds (3-1) and (3-3), compounds (3-1) and (3-5) or compounds (3-1) and (3-6).

Desirable compounds (4) are compounds (4-1) to (4-26) described in item 13. A desirable composition includes compound (4-1), (4-2) or (4-18). A mode desirable composition includes compounds (4-1) and (4-2), compounds (4-1) and (4-18) or compounds (4-2) and (4-18).

Sixth, additives that may be added to the composition are explained. Such additives include an optically active compound, an antioxidant, an UV light absorbent, a coloring matter, an antifoaming agent, a polymerizable compound, a polymerization initiator and a polymerization inhibitor. The optically active compound is added to the composition to induce a helical structure of liquid crystal molecules and giving a twist angle, and examples thereof include compounds (5-1) to (5-5). A desirable proportion of the optically active compound is about 5 wt % or less, and a more desirable proportion is in a range of about 0.01 wt % to about 2 wt %.

The antioxidant is added to the composition in order to prevent a decrease in specific resistance that is caused by heating under air, or to maintain a large voltage holding ratio at a temperature close to the maximum temperature as well as at room temperature, after the device has been used for a long time.

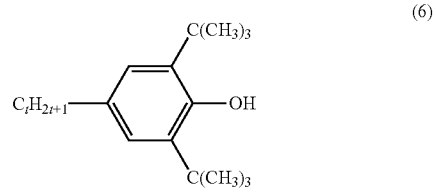

A desirable example of the antioxidant is compound (6) where t is an integer from 1 to 9, for instance. In compound (6), desirable t is 1, 3, 5, 7 or 9. More desirable t is 1 or 7. Compound (6) where t is 1 is effective in preventing a decrease in specific resistance that is caused by heating under air, because it has a large volatility. Compound (6) where t is 7 is effective in maintaining a large voltage holding ratio at a temperature close to the maximum temperature as well as at room temperature, after the device has been used for a long period of time, since it has a small volatility. A desirable proportion of the antioxidant is about 50 ppm or more for achieving its effect and is about 600 ppm or less for avoiding a decrease in the maximum temperature or avoiding an increase in the minimum temperature. A more desirable proportion is in the range of about 100 ppm to about 300 ppm.

Desirable examples of the UV light absorbent include benzophenone derivatives, benzoate derivatives and triazole derivatives. A light stabilizer such as an amine having steric hindrance is also desirable. A desirable proportion of the UV light absorber or the light stabilizer is about 50 ppm or more for achieving its effect and is about 10,000 ppm or less for avoiding a decrease in the maximum temperature or avoiding an increase in the minimum temperature. A more desirable proportion is in the range of about 100 ppm to about 10,000 ppm.

A dichroic dye such as an azo dye or an anthraquinone dye is added to the composition for adjusting to a device having a guest host (GH) mode. A desirable proportion of the coloring matter is in the range of about 0.01 wt % to about 10 wt %. The antifoaming agent such as dimethyl silicone oil or methyl phenyl silicone oil is added to the composition for preventing foam formation. A desirable proportion of the antifoaming agent is about 1 ppm or more for achieving its effect and is about 1,000 ppm or less for avoiding a poor display. A more desirable proportion is in the range of about 1 ppm to about 500 ppm.

The polymerizable compound is used for adjusting to a device of a PSA (polymer sustained alignment) mode. Compounds (1) and (4) are suitable for this purpose. Other polymerizable compound that is different from compound (1) or (4) may be added to the composition, together with compounds (1) and (4). Desirable examples of other polymerizable compound include compounds such as acrylates, methacrylates, vinyl compounds, vinyloxy compounds, propenyl ethers, epoxy compounds (oxiranes, oxetanes) and vinyl ketones. More desirable examples are acrylate derivatives and methacrylate derivatives. When any other polymerizable compound is added, a desirable proportion of compound (1) or a desirable proportion of a combination of compounds (1) and (4) is about 10 wt % or more based on the total weight of the polymerizable compound. A more desirable proportion is about 50 wt % or more. A particularly desirable proportion is about 80 wt % or more, or even 100 wt %. The reactivity of the polymerizable compound or the pretilt angle of liquid crystal molecules can be adjusted by a combination of compounds (1) and (4) or by a combination of compound (1) and (4) and other polymerizable compound in a suitable ratio. A short response time of the device can be achieved by optimizing the pretilt angle. A large contrast ratio or a long service life can be achieved, since the orientation of liquid crystal molecules is stabilized.

A polymerizable compound such as compound (1) or (4) is polymerized on irradiation with UV light, possibly in the presence of an initiator such as a photo-polymerization initiator. Suitable conditions for polymerization, and a suitable type and amount of the initiator are known to a person of ordinary skill in the art, and are described in the literature. For example, Irgacure 651™ (BASF), Irgacure 184™ (BASF) or Darocure 1173™ (BASF), each of which is a photo-initiator, is suitable for radical polymerization. A desirable proportion of the photo-polymerization initiator is in the range of about 0.1 wt % to about 5 wt % based on the weight of the polymerizable compound. A more desirable proportion is in the range of about 1 wt % to about 3 wt %.

The polymerization inhibitor may be added in order to prevent polymerization when a polymerizable compound such as compound (1) or (4) is kept in storage. The polymerizable compound is usually added to the composition without removing the polymerization inhibitor. Examples of the polymerization inhibitor include hydroquinone derivatives such as hydroquinone and methylhydroquinone, 4-t-butylcatechol, 4-methoxyphenol and phenothiazine.

Seventh, methods for synthesizing the component compounds are explained. These compounds can be synthesized by known methods. The synthetic methods are exemplified below. Compound (1) is commercially available or is prepared by the method described in JP 2012-001526 A. The method for forming $Z^1$ and $Z^3$ is described in WO 2010-131600 A. The method for transforming ring-O—$CH_2$—CHO to ring-O—CH=CH—O-Bz is described in Scheme 4 of *J. Org. Chem.*, 65, 2875-2886 (2000). Compounds (1-1-2) and (1-1-3) are commercially available from Mitsubishi Gas Chemical Company, Inc. in the trade name of Diapurest. Compounds (2-1) and (2-5) are prepared by the method described in JP H02-503441 A (1990). Compounds (3-1) and (3-5) are prepared by the method described in JP S59-176221 A (1984). Compound (4) is prepared by reference to JP 2012-001526 A and WO 2010-131600 A. Compound (4-18) is prepared by the method described in JP H07-101900 A (1995). An antioxidant is commercially available. A compound of formula (6) where t is 1 is available from Sigma-Aldrich Corporation. Compound (6) where t is 7, for instance, is synthesized with the method described in U.S. Pat. No. 3,660,505.

Compounds whose synthetic methods are not described can be prepared with the methods described in books such as "Organic Syntheses" (John Wiley & Sons, Inc.), "Organic Reactions" (John Wiley & Sons, Inc.), "Comprehensive Organic Synthesis" (Pergamon Press), and "New experimental Chemistry Course" (Maruzen Co., Ltd., Japan). The composition is prepared with known methods using the compounds thus obtained. For example, the component compounds are mixed and dissolved in each other by heating.

Last, the use of the composition are explained. The composition mainly has a minimum temperature of about −10° C. or lower, a maximum temperature of about 70° C. or higher, and an optical anisotropy in the range of about 0.07 to about 0.20. A composition having an optical anisotropy in the range of about 0.08 to about 0.25 may be prepared by adjusting the ratio of the component compounds or by mixing with other liquid crystal compound. Further, a composition having an optical anisotropy in the range of about 0.10 to about 0.30 may be prepared by this method. A device including this composition has a large voltage holding ratio. This composition is suitable for an AM device, especially for an AM device of a transmission type. This composition can be used as a composition having a nematic phase and as an optically active composition by adding an optically active compound.

The composition can be used for an AM device. It can also be used for a PM device. The composition can also be used for the AM device and the PM device having a mode such as PC, TN, STN, ECB, OCB, IPS, FFS, VA or FPA. It is especially desirable to use the composition for the AM device having a mode of IPS, FFS or VA. These devices may be of a reflection type, a transmission type or a semi-transmission type. It is desirable to use the composition for a device having the transmission type. The composition can be used for an amorphous silicon-TFT device or a polycrystal silicon-TFT device. The composition is also usable for an NCAP (nematic curvilinear aligned phase) device prepared by microcapsulating the composition, and for a PD (polymer dispersed) device in which a 3D network-polymer is formed in the composition.

One example of methods for producing the device of a polymer sustained alignment type is as follows. A device having two substrates called an array substrate and a color filter substrate is prepared. At least one of the substrates has an electrode layer. Liquid crystal compounds are mixed to give a liquid crystal composition. A polymerizable compound is added to this composition. An additive may be further added as required. The composition is poured into the device. The device is irradiated with light, preferably UV light, while being applied with a voltage, so as to polymerize the polymerizable compound and form a composition including a polymer. The device of a polymer sustained alignment type can be produced by this procedure.

In the procedure, liquid crystal molecules are oriented by the effect of an electric field when a voltage is applied. The molecules of the polymerizable compound are also oriented according to the orientation. A polymer where the orientation is maintained is formed since the polymerizable compound is polymerized by UV light under these conditions. The response time of the device is decreased by the effect of the polymer. Image burn-in can also be reduced at the same time by the effect of the polymer, since the burn-in is a malfunction of liquid crystal molecules. Incidentally, it may be possible that the polymerizable compound in the composition is polymerized in advance and then this composition is placed between the substrates of an LCD device.

EXAMPLES

The invention will be explained in more details by way of examples, but is not limited to the examples. The invention includes a mixture of composition (LC-A) and composition (LC-B). The invention also includes a mixture prepared by mixing at least two compositions in Examples. Compounds prepared herein were identified by methods such as NMR analysis. The characteristics of the compounds, compositions and devices were measured by the methods described below.

NMR Analysis

A model DRX-500 apparatus made by Bruker BioSpin Corporation was used for the measurement. In the measurement of $^1$H-NMR, a sample was dissolved in a deuterated solvent such as $CDCl_3$, and the measurement was carried out under the conditions of room temperature, 500 MHz and an accumulation of 16 scans. Tetramethylsilane was used as an internal standard. In the measurement of $^{19}$F-NMR, $CFCl_3$ was used as the internal standard, and 24 scans were accumulated. In the explanation of the NMR spectra, the symbols s, d, t, q, quin, sex, m and br stand for a singlet, a doublet, a triplet, a quartet, a quintet, a sextet, a multiplet and a broad peak, respectively.

Gas Chromatographic Analysis:

A gas chromatograph Model GC-14B made by Shimadzu Corporation was used for the measurement. The carrier gas was helium (2 mL/min). The sample injector and the detector (FID) were set to 280° C. and 300° C., respectively. A capillary column DB-1 (length: 30 m, bore: 0.32 mm, film thickness: 0.25 µm; dimethylpolysiloxane as the stationary phase; non-polar) made by Agilent Technologies, Inc. was used to separate component compounds. After being kept at 200° C. for 2 min, the column was further heated to 280° C. at a rate of 5° C./min. A sample was dissolved in acetone (0.1 wt %), and 1 µL of the solution was injected into the sample injector. The recorder used was Model C-R5A Chromatopac Integrator made by Shimadzu Corporation or its equivalent. The resulting gas chromatogram showed the retention time of peaks and the peak areas corresponding to the component compounds.

A solvent for diluting the sample may also be used, such as chloroform or hexane, etc. The following capillary columns may also be used to separate the component compounds: HP-1 made by Agilent Technologies Inc. (length: 30 m, bore: 0.32 mm, film thickness: 0.25 µm), Rtx-1 made by Restek Corporation (length: 30 m, bore: 0.32 mm, film thickness: 0.25 µm), and BP-1 made by SGE International Pty. Ltd. (length: 30 m, bore: 0.32 mm, film thickness: 0.25 µm). A capillary column CBP1-M50-025 (length: 50 m, bore: 0.25 mm, film thickness: 0.25 µm) made by Shimadzu Corporation may also be used for avoiding an overlap of peaks of the compounds.

The proportions of the liquid crystal compounds included in the composition may be calculated with the following method. A mixture of the liquid crystal compounds are detected by use of a gas chromatograph (FID). The ratio of peak areas in the gas chromatogram corresponds to the ratio (weight ratio) of the liquid crystal compounds. When the capillary columns described above are used, the correction coefficient of the respective liquid crystal compounds may be regarded as 1 (one). Accordingly, the proportions (weight percentage) of the liquid crystal compounds can be calculated from the ratio of the peak areas.

Samples for Measurement

A composition itself was used as a sample when the characteristics of the composition or the device were measured. When the characteristics of a compound were measured, a sample for measurement was prepared by mixing this compound (15 wt %) with a mother liquid crystal (85 wt %). The characteristic values of the compound were calculated from the values obtained from measurements by an extrapolation method: (Extrapolated value)=(Measured value of sample)−0.85×(Measured value of mother liquid crystal)/0.15. When a smectic phase (or crystals) deposited at 25° C. at this ratio, the ratio of the compound to the mother liquid crystals was changed in the order of (10 wt %:90 wt %), (5 wt %:95 wt %) and (1 wt %:99 wt %). The values of the maximum temperature, the optical anisotropy, the viscosity and the dielectric anisotropy regarding the compound were obtained by means of this extrapolation method.

The mother liquid crystal described below was used. The proportions of the component compounds were expressed as weight percentages.

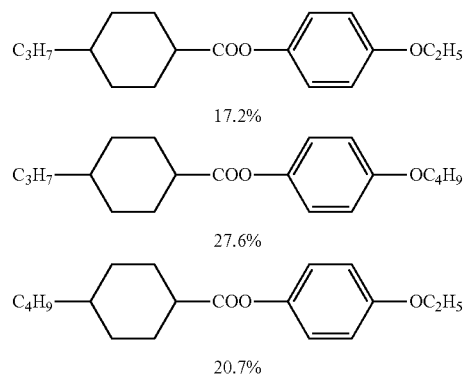

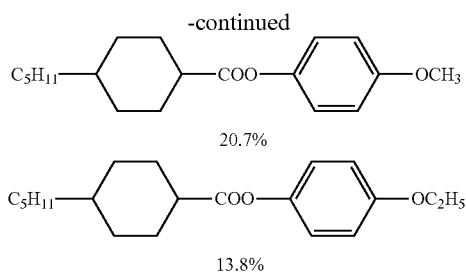

20.7%

13.8%

Measurement Methods

The characteristics were measured with the following methods. Most are methods described in the JEITA standards "JEITA-ED-2521B" which was deliberated and established by Japan Electronics and Information Technology Industries Association (abbreviated to JEITA), or the modified methods. No thin film transistors (TFT) were attached to the TN device used for the measurement.

1) Maximum Temperature of a Nematic Phase (NI; ° C.): A sample was placed on a hot plate in a melting point apparatus equipped with a polarizing microscope and was heated at a rate of 1° C./min. The temperature was measured when a part of the sample began to change from a nematic phase to an isotropic liquid. The higher limit of the temperature range of a nematic phase may be abbreviated to the "maximum temperature."

2) Minimum Temperature of a Nematic Phase (Tc; ° C.): A sample having a nematic phase was placed in glass vials and then kept in freezers at temperatures of 0° C., −10° C., −20° C., −30° C. and −40° C. for 10 days, and then the liquid crystal phases were observed. For example, when the sample maintained the nematic phase at −20° C. and changed to crystals or a smectic phase at −30° C., To was expressed as "<−20° C." The lower limit of the temperature range of a nematic phase may be abbreviated to "the minimum temperature."

3) Viscosity (bulk viscosity; η; measured at 20° C.; mPa·s): An E-type viscometer made by Tokyo Keiki Inc. was used for the measurement.

4) Viscosity (rotational viscosity; γ1; measured at 25° C.; mPa·s): The measurement was carried out with the method described in M. Imai, et al., *Molecular Crystals and Liquid Crystals*, Vol. 259, p. 37 (1995). A sample was poured into a VA device in which the distance between the two glass substrates (cell gap) was 20 μm. A voltage in the range of 39 V to 50 V was applied stepwise with an increment of 1 volt to this device. After a period of 0.2 second with no voltage, a voltage was applied repeatedly under the conditions of only one rectangular wave (rectangular pulse; 0.2 sec) and no voltage (2 sec). The peak current and the peak time of the transient current generated by the applied voltage were measured. The value of rotational viscosity was obtained from these measured values and Equation (8) on page 40 of the paper of M. Imai, et al. The value of the dielectric anisotropy necessary for the present calculation was measured according to item 6).

5) Optical anisotropy (refractive index anisotropy; Δn; measured at 25° C.): The measurement was carried out using an Abbe refractometer with a polarizing plate attached to the ocular, using light at a wavelength of 589 nanometers. The surface of the main prism was rubbed in one direction, and then a sample was placed on the main prism. The refractive index $n_\parallel$ was measured when the direction of the polarized light was parallel to that of the rubbing. The refractive index $n_\perp$ was measured when the direction of polarized light was perpendicular to that of the rubbing. The value of Δn was calculated with the equation "Δn=$n_\parallel$ −$n_\perp$."

6) Dielectric anisotropy (Δ∈; measured at 25° C.): The value of dielectric anisotropy was calculated with the equation "Δ∈=$\varepsilon_\parallel$ −∈$_\perp$." The dielectric constants $\varepsilon_\parallel$ and ∈$_\perp$ were measured as follows.

1) Measurement of the dielectric constant $\varepsilon_\parallel$: A solution of octadecyltriethoxysilane (0.16 mL) in ethanol (20 mL) was applied to thoroughly cleaned glass substrates. The glass substrates were rotated with a spinner, and then heated at 150° C. for one hour. A sample was poured in a VA device in which the distance between the two glass substrates (cell gap) was 4 μm, and then this device was sealed with a UV-curable adhesive. Sine waves (0.5 V, 1 kHz) were applied to this device, and the dielectric constant $\varepsilon_\parallel$ in the major axis direction of liquid crystal molecules was measured after 2 sec.

2) Measurement of the dielectric constant ∈$_\perp$: A polyimide solution was applied to thoroughly cleaned glass substrates. The glass substrates were calcined, and then the resulting alignment film was subjected to rubbing. A sample was poured into a TN device in which the distance between the two glass substrates (cell gap) was 9 μm and the twist angle was 80°. Sine waves (0.5 V, 1 kHz) were applied to this device, and the dielectric constant ∈$_\perp$ in the minor axis direction of liquid crystal molecules was measured after 2 sec.

7) Threshold voltage (Vth; measured at 25° C.; V): An LCD evaluation system Model LCD-5100 made by Otsuka Electronics Co., Ltd. was used for the measurement. The light source was a halogen lamp. A sample was poured into a VA device having a normally black mode, in which the distance between the two glass substrates (cell gap) was 4 μm and the rubbing direction was antiparallel, and then this device was sealed with a UV-curable adhesive. The voltage to be applied to this device (60 Hz, rectangular waves) was stepwise increased in 0.02 V increments from 0 V up to 20 V. During the increase, the device was vertically irradiated with light, and the amount of light passing through the device was measured. A voltage-transmittance curve was prepared, in which the maximum amount of light corresponded to 100% transmittance and the minimum amount of light corresponded to 0% transmittance. The threshold voltage was expressed as the voltage at 10% transmittance.

8) Voltage Holding Ratio (VHR-1a; measured at 25° C.; %): A TN device used for measurement had a polyimide-alignment film, and the distance between the two glass substrates (cell gap) was 5 μm. A sample was poured in the device, and then this device was sealed with a UV-curable adhesive. A pulse voltage (60 microseconds at 5 V) was applied to this device and the device was charged. A decreasing voltage was measured for 166.7 milliseconds with a high-speed voltmeter, and area A between the voltage curve and the horizontal axis in a unit cycle was obtained. The voltage holding ratio was expressed as a percentage of area A to area B that was the area without the decrease.

9) Voltage Holding Ratio (VHR-2a; measured at 60° C.; %): The voltage holding ratio was measured by the method described above, except that it was measured at 60° C. instead of 25° C. The resulting values were represented by the symbol VHR-2a. In a composition including a polymerizable compound, the TN device was irradiated with UV light of 25 mW/cm² for 400 sec, while a voltage of 15 V was applied, to polymerize the compound. A mercury-xenon lamp, Model Execure 4000-D, made by Hoya Candeo Optronics Corp. was used for the irradiation with UV light.

10) Voltage Holding Ratio (VHR-3a; measured at 60° C.; %): The stability to UV light was evaluated by measuring a voltage holding ratio after irradiation with UV light. A TN device used for the measurement had a polyimide-alignment film and the cell gap was 5 μm. A sample was poured into this device, and then the device was irradiated with light for 167 min. The light source was a black light (peak wavelength, 369 nm), and the distance between the device and the light source was 5 μm. In the measurement of VHR-3a, a decreasing voltage was measured for 166.7 milliseconds. In a composition including a polymerizable compound, polymerization was carried out under the conditions described in item 9). A composition having a large VHR-3a has a large stability to UV light.

11) Voltage Holding Ratio (VHR-4a; measured at 25° C.; %): A TN device into which a sample was poured was heated in a constant-temperature bath at 80° C. for 500 hours, and then the stability to heat was evaluated by measuring the voltage holding ratio. In the measurement of VHR-4a, a decreasing voltage was measured for 166.7 milliseconds. A composition having a large VHR-4a has a high stability to heat.

12) Response Time (τ; measured at 25° C.; millisecond): An LCD evaluation system Model LCD-5100 made by Otsuka Electronics Co., Ltd. was used for the measurement. The light source was a halogen lamp. The low-pass filter was set at 5 kHz.

1) For a composition not including a polymerizable compound: A sample was poured into a VA device having a normally black mode, in which the distance between the two glass substrates (cell gap) was 4 μm, and the rubbing direction was antiparallel. This device was sealed with a UV-curable adhesive. Rectangular waves (60 Hz, 10 V, 0.5 second) were applied to this device. The device was vertically irradiated with light simultaneously, and the amount of light passing through the device was measured. The transmittance was regarded as 100% when the amount of light reached a maximum, and was regarded as 0% when the amount of light reached a minimum. The response time was expressed as the period of time required for the change from 90% to 10% transmittance (fall time: millisecond).

2) For a composition including a polymerizable compound: A sample was poured into a PVA device having a normally black mode, in which the distance between the two glass substrates (cell gap) was 3.2 μm, and the rubbing direction was antiparallel. This device was sealed with a UV-curable adhesive. The device was irradiated with ultraviolet light of 25 mW/cm² for 400 sec, while a voltage of 15 V was applied, to polymerize the compound. A mercury-xenon lamp, Model Execure 4000-D, made by Hoya Candeo Optronics Corp. was used for the irradiation with UV light. Rectangular waves (60 Hz, 10 V, 0.5 sec) were applied to this device. The device was vertically irradiated with light simultaneously, and the amount of light passing through the device was measured. The transmittance was regarded as 100% when the amount of light reached a maximum, and was regarded as 0% when the amount of light reached a minimum. The response time was expressed as the period of time required for the change from 0% to 90% transmittance (rise time: millisecond).

13) Specific Resistance (ρ; measured at 25° C.; Ω·cm): A sample of 1.0 mL was poured into a vessel equipped with electrodes. A DC voltage (10 V) was applied to the vessel, and the DC current was measured after 10 sec. The specific resistance was calculated by the equation "(specific resistance)= [(voltage)×(electric capacity of vessel)]/[(DC current)×(dielectric constant in vacuum)]."

14) Concentration of Residual Monomer (ReM; wt %): A sample was prepared by adding a polymerizable compound to a liquid crystal composition in a proportion of 0.3 wt %. A VA device used for the measurement had a polyimide alignment film that induced homeotropic orientation and an ITO film, and the distance between the two glass substrates (cell gap) was 3.5 μm. The sample was poured in the device, and irradiated with UV light of 80 mW/cm² for 375 sec while a voltage of 15 V was applied. A UV irradiation apparatus made by Eye Graphics Co., Ltd. was used for the UV-irradiation. The concentration of the residual monomer was then measured by HPLC. The concentration of the residual monomer is the proportion (wt %) of unreacted polymerizable compound based on the liquid crystal composition.

15) Pretilt Angle (Pt; measured at room temperature; degree): A sample was prepared by adding a polymerizable compound to a liquid crystal composition in a proportion of 0.3 wt %. A VA device used for the measurement had a polyimide alignment film that induced homeotropic orientation and an ITO film, and the distance between the two glass substrates (cell gap) was 3.5 μm. The sample was poured in the device, and the pretilt angle was measured on an ellipsometer REST 100 made by Otsuka Electronics Co., Ltd. The device was then irradiated with UV light of 80 mW/cm² for 625 sec while a voltage of 15 V was applied. A UV-irradiation apparatus made by Eye Graphics Co., Ltd. was used for the UV-irradiation. The pretilt was measured again. The pretilt angle is the angle between the normal line of the substrate and liquid crystal molecules.

The compounds described in Examples were expressed in terms of symbols according to the definition in Table 3 described below. In Table 3, the configuration of 1,4-cyclohexylene is trans. The parenthesized number next to a symbolized compound in any Example corresponds to the number of the compound. The symbol "(-)" means any other liquid crystal compound. The proportion (percentage) of a liquid crystal compound means the weight percentages (wt %) based on the liquid crystal composition. Last, the values of characteristics of the composition are summarized.

TABLE 3

Method of Description of Compounds using Symbols
R—(A$_1$)—Z$_1$—...—Z$_n$—(A$_n$)—R'

| 1) Left-terminal Group R— | Symbol |
|---|---|
| $C_nH_{2n+1}$— | n— |
| $C_nH_{2n+1}O$— | nO— |
| $C_mH_{2m+1}OC_nH_{2n}$— | mOn— |
| $CH_2$=CH— | V— |
| $C_nH_{2n+1}$—CH=CH— | nV— |
| $CH_2$=CH—$C_nH_{2n}$— | Vn— |
| $C_mH_{2m+1}$—CH=CH—$C_nH_{2n}$— | mVn— |
| $CF_2$=CH— | VFF— |
| $CF_2$=CH—$C_nH_{2n}$— | VFFn— |
| $CH_2$=CHCOO— | AC— |
| $CH_2$=C(CH$_3$)COO— | MAC— |
| $CH_2$=CHOCOO— | VCA— |
| $CH_2$=CHCH$_2$OCOO— | ACA— |

| 2) Right-terminal Group —R' | Symbol |
|---|---|
| —$C_nH_{2n+1}$ | —n |
| —$OC_nH_{2n+1}$ | —On |
| —CH=CH$_2$ | —V |
| —CH=CH—$C_nH_{2n+1}$ | —Vn |
| —$C_nH_{2n}$—CH=CH$_2$ | —nV |
| —CH=CF$_2$ | —VFF |
| —COOCH$_3$ | —EMe |
| —OCOCH=CH$_2$ | —AC |
| —OCOC(CH$_3$)=CH$_2$ | —MAC |

TABLE 3-continued

Method of Description of Compounds using Symbols
R—(A₁)—Z₁—...—Zₙ—(Aₙ)—R'

| 3) Bonding Group —Zₙ— | Symbol |
|---|---|
| —CₙH₂ₙ₊₁— | n |
| —COO— | E |
| —CH=CH—O— | VO |
| —O—CH=CH— | OV |
| —CH=CH— | V |
| —CF₂O— | X |
| —OCH₂— | O1 |
| —CH₂O— | 1O |
| —O— | O |

| 4) Ring —Aₙ— | Symbol |
|---|---|
|  | H |
| 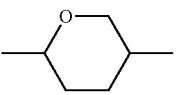 | Dh |
| 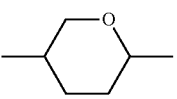 | dh |
|  | B |
| 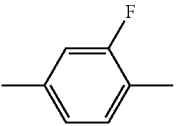 | B(F) |
| 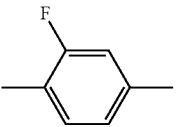 | B(2F) |
| 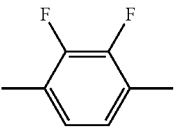 | B(2F, 3F) |
| 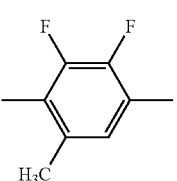 | B(2F, 3F, 6Me) |
| 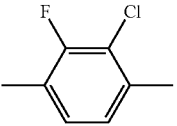 | B(2F, 3CL) |
| 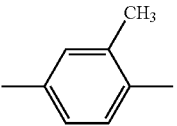 | B(Me) |
| 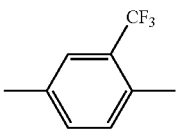 | B(CF3) |
| 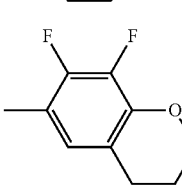 | Cro(7F, 8F) |
| 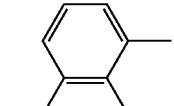 | Np(1, 5) |
| 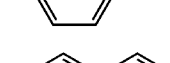 | Np(2, 6) |

5) Examples of Description

Example 1. 3-HB(2F, 3F)—O2

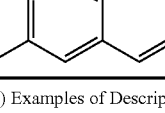

Example 2. 3-HDhB(2F, 3F)—O2

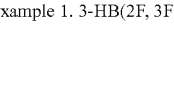

1. Solubility of the Polymerizable Compound

Examples 1

Composition (LC-A) was prepared by mixing the liquid crystal compounds described below. The components and characteristics of the composition were as follows.

Composition (LC-A)

| | | |
|---|---|---|
| 3-H1OB(2F,3F)-O2 | (2-3) | 4% |
| V2-BB(2F,3F)-O1 | (2-4) | 5% |
| V2-BB(2F,3F)-O2 | (2-4) | 9% |
| 1V2-BB(2F,3F)-O2 | (2-4) | 6% |
| V-HHB(2F,3F)-O1 | (2-6) | 3% |
| V-HHB(2F,3F)-O2 | (2-6) | 10% |
| 3-HH1OB(2F,3F)-O2 | (2-8) | 11% |
| 2-BB(2F,3F)B-3 | (2-9) | 9% |
| 3-HH-V | (3-1) | 27% |
| 3-HH-V1 | (3-1) | 9% |
| 3-HHB-O1 | (3-5) | 3% |
| V-HHB-1 | (3-5) | 4% |

NI=75.6° C.; Δn=0.111; Δ∈=−3.1.

Polymerizable compound (1-1-1-1) was added to the composition (LC-A) described above, and the mixture was heated at 120° C. for 5 min. The composition was placed in glass vials, which were kept at 25° C., 0° C., −10° C. and −20° C., respectively. After 7 days, whether the nematic phase had been maintained or crystals was deposited was determined by visual observation.

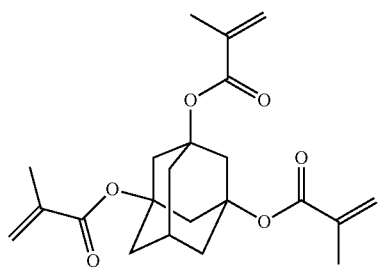

(1-1-1-1)

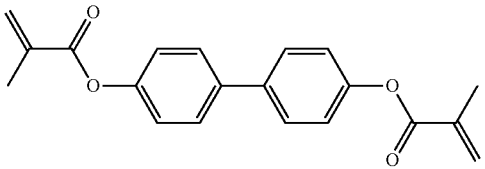

(4-2-1)

Examples 2 to 10 and Comparative Examples 1 to 9

In Examples 2 to 8, the solubility of the mixture prepared by the addition of polymerizable compound (1-1-3-1) to composition (LC-A) was evaluated in the same manner of Example 1. In Examples 9 and 10, a mixture in which polymerizable compound (1-1-3-1) and polymerizable compound (4-1-1) or (4-2-1) were added was evaluated. In Comparative Examples 1 to 8, a mixture in which polymerizable compound (4-1-1) or (4-2-1) alone was added was evaluated. The results are shown in Table 4. In Table 4, "○" means that crystals were not observed, and "×" means that crystals were observed.

TABLE 4

| | Solubility of the polymerizable compound | | | | | | | |
|---|---|---|---|---|---|---|---|---|
| | Polymerizable Compound (1) | | Polymerizable Compound (4) | | Solubility Test (Temperature, degree C.) | | | |
| | Formula | Added Amount (% by weight) | Formula | Added Amount (% by weight) | 25 | 0 | −10 | −20 |
| Example 1 | (1-1-1-1) | 0.50 | — | — | ○ | ○ | ○ | ○ |
| Example 2 | (1-1-1-1) | 0.80 | — | — | ○ | ○ | ○ | ○ |
| Example 3 | (1-1-1-1) | 1.50 | — | — | ○ | ○ | ○ | ○ |
| Example 4 | (1-1-1-1) | 2.00 | — | — | ○ | ○ | × | × |
| Example 5 | (1-1-3-1) | 0.50 | — | — | ○ | ○ | ○ | ○ |
| Example 6 | (1-1-3-1) | 0.80 | — | — | ○ | ○ | ○ | ○ |
| Example 7 | (1-1-3-1) | 1.50 | — | — | ○ | ○ | ○ | ○ |
| Example 8 | (1-1-3-1) | 2.00 | — | — | ○ | ○ | ○ | ○ |
| Example 9 | (1-1-1-1) | 0.50 | (4-1-1) | 0.50 | ○ | ○ | ○ | ○ |
| Example 10 | (1-1-1-1) | 0.25 | (4-2-1) | 0.25 | ○ | ○ | ○ | ○ |
| Comparative Example 1 | — | — | (4-1-1) | 0.50 | ○ | ○ | ○ | ○ |
| Comparative Example 2 | — | — | (4-1-1) | 0.80 | ○ | ○ | ○ | × |
| Comparative Example 3 | — | — | (4-1-1) | 1.50 | ○ | ○ | × | × |
| Comparative Example 4 | — | — | (4-1-1) | 2.00 | ○ | × | × | × |
| Comparative Example 5 | — | — | (4-2-1) | 0.50 | ○ | ○ | × | × |
| Comparative Example 6 | — | — | (4-2-1) | 0.80 | ○ | × | × | × |
| Comparative Example 7 | — | — | (4-2-1) | 1.50 | × | × | × | × |
| Comparative Example 8 | — | — | (4-2-1) | 2.00 | × | × | × | × |
| Comparative Example 9 | — | — | — | — | ○ | ○ | ○ | ○ |

-continued

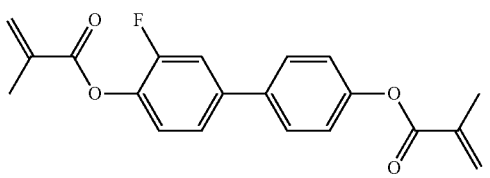

(4-1-1)

(1-1-3-1)

Comparative Example 9 in Table 4 shows a blank test. Crystals was not deposited even at −20° C. in composition (LC-A) to which a polymerizable compound was not added. Compound (1) was added as a polymerizable compound in Examples 1 to 8. Crystals were deposited at low temperatures when the added amount was 2 wt % as in the case of Example 4. In other Examples, the solubility was good. In Examples 9 and 10, both of compounds (1) and (4) were added to composition (LC-A), and the solubility was good. In contrast, compound (4) was added as a polymerizable compound in Comparative Examples 1 to 8. A good solubility was observed when the added amount was 0.50 wt % as in the case Comparative Example 1, however, in the remaining seven Examples crystals were deposited. Compound (1) can be dissolved in the composition in a larger proportion as is shown in Table 4. A larger pretilt angle was achieved in the composition of the invention, accordingly.

2. Pretilt Angle

Example 11

Polymerizable compound (1-1-1-1) was added to composition (LC-A) in a proportion of 0.80 wt %. The composition had NI of 75.5° C., Δn of 0.111, Δ∈ of −3.1, and the values were almost equivalent to those of composition (LC-A). The composition was irradiated with UV light according to item 14) described above. Polymerization of compound (1-1-1-1) was not completed and was interrupted by setting up the conditions of light dose at 80 mW/cm$^2$ for 375 sec. This method is suitable to evaluate the reactivity of a polymerizable compound and to measure an ability of the polymer giving a pretilt angle to liquid crystal molecules. After UV-irradiation, the concentration of the residual monomer was measured and found to be 0.61 wt %. The amount of compound (1-1-1-1) was reduced from 0.80 wt % to 0.61 wt % in spite of a small light dose. From the results, it was found that the compound had a good polymerizability. The pretilt angles were measured before and after the UV-irradiation according to item 15) described above. The results were 0.2° and 1.3°, respectively. It was thus found that the polymer of polymerizable compound (1-1-1-1) could give a large pretilt angle to liquid crystal molecules.

Examples 12 to 14 and Comparative Example 10

In Examples 12 to 14 and Comparative Example 10, the concentration of the residual monomer (ReM) and the pretilt angle (Pt) before and after the UV-irradiation were measured in the same manner of Example 11. The results are shown in Table 5.

is effective. Incidentally, a pretilt angle was 1.1° for polymerizable compound (4-1-1) in Example 10, which supports the combination effect.

Examples 15 to 26

In Examples and Comparative Examples described above, composition (LC-A) was used. Next, compositions (LC-B) to (LC-M) were prepared, and polymerizable compound (1-1-1-1) was added to these compositions respectively. The components and the characteristics of these composition were as follows.

| Composition (LC-B) | | |
| --- | --- | --- |
| 3-H1OB(2F,3F)-O2 | (2-3) | 8% |
| V2-BB(2F,3F)-O1 | (2-4) | 5% |
| V2-BB(2F,3F)-O2 | (2-4) | 9% |
| 1V2-BB(2F,3F)-O4 | (2-4) | 6% |
| V-HHB(2F,3F)-O2 | (2-6) | 10% |
| V-HHB(2F,3F)-O4 | (2-6) | 3% |
| 1V2-HHB(2F,3F)-O2 | (2-6) | 4% |
| 3-HH1OB(2F,3F)-O2 | (2-8) | 11% |
| 3-HH-V | (3-1) | 26% |
| 1-HH-2V1 | (3-1) | 5% |
| 5-HB-O2 | (3-2) | 4% |
| 3-HHB-O1 | (3-5) | 5% |
| V-HHB-1 | (3-5) | 4% |

NI=74.0° C.; Δn=0.101; Δ∈=−3.4.

| Composition (LC-C) | | |
| --- | --- | --- |
| 3-BB(2F,3F)-O2 | (2-4) | 9% |
| 2O-BB(2F,3F)-O2 | (2-4) | 3% |
| 2-HH1OB(2F,3F)-O2 | (2-8) | 10% |
| 3-HH1OB(2F,3F)-O2 | (2-8) | 20% |

TABLE 5

Concentration of Residual Monomer and Pretit Angle in Composition (LC-A)

| | Polymerizable Compound (1) | | | Polymerizable Compound (4) | | | Pretilt Angle (deree) | |
| --- | --- | --- | --- | --- | --- | --- | --- | --- |
| | Formula | Added Amount (% by weight) | Residual Monomer (% by weight) | Formula | Added Amount (% by weight) | Residual Monomer (% by weight) | Before UV irradiation | After UV irradiation |
| Example 11 | (1-1-1-1) | 0.80 | 0.61 | — | — | — | 0.2 | 1.3 |
| Example 12 | (1-1-3-1) | 0.80 | 0.50 | — | — | — | 0.2 | 3.5 |
| Example 13 | (1-1-3-1) | 0.50 | 0.32 | — | — | — | 0.2 | 1.8 |
| Example 14 | (1-1-1-1) | 0.30 | 0.17 | (4-1-1) | 0.30 | 0.20 | 0.2 | 2.0 |
| Comparative Example 10 | — | — | — | (4-1-1) | 0.30 | 0.21 | 0.2 | 1.1 |

From the difference between the added amount of the polymerizable compound and the concentration of the residual monomer in Examples 11 to 14, it was found that the polymerizable compound was effectively consumed by polymerization. With regard to the pretilt angle, it was found that the polymer of polymerizable compound (1-1-3-1) used in Examples 12 and 13 was useful as well as the polymer of polymerizable compound (1-1-1-1) used in Example 11 is useful. In Example 14, the pretilt angle after the UV-irradiation was 2.0° when polymerizable compound (1-1-1-1) was added along with polymerizable compound (4-1-1). The value was larger than 1.3° in Example 11. The results show that a combination of two kinds of polymerizable compounds -continued

| Composition (LC-C) | | |
| --- | --- | --- |
| 2-BB(2F,3F)B-4 | (2-9) | 3% |
| 2-HH-3 | (3-1) | 19% |
| 3-HH-4 | (3-1) | 4% |
| 3-HH-V | (3-1) | 8% |
| V2-BB-1 | (3-3) | 3% |
| 1-BB-3 | (3-3) | 6% |
| V-HHB-3 | (3-5) | 5% |
| 3-HBB-2 | (3-6) | 4% |
| 5-B(F)BB-2 | (3-7) | 3% |
| 5-HBBH-3 | (3-11) | 3% |

NI=83.6° C.; Δn=0.108; Δ∈=2.8.

| Composition (LC-D) | | |
|---|---|---|
| 3-BB(2F,3F)-O2 | (2-4) | 10% |
| 5-BB(2F,3F)-O4 | (2-4) | 3% |
| 2-HH1OB(2F,3F)-O2 | (2-8) | 10% |
| 3-HH1OB(2F,3F)-O2 | (2-8) | 22% |
| 2-HH-3 | (3-1) | 21% |
| 3-HH-V | (3-1) | 8% |
| 1-BB-3 | (3-3) | 8% |
| 1V2-BB-1 | (3-3) | 3% |
| V2-HHB-1 | (3-5) | 5% |
| 3-HBB-2 | (3-6) | 4% |
| 5-B(F)BB-3 | (3-7) | 3% |
| 1O1-HBBH-4 | (—) | 3% |

NI=78.6° C.; Δn=0.107; Δ∈=−2.6.

| Composition (LC-E) | | |
|---|---|---|
| V2-BB(2F,3F)-O2 | (2-4) | 12% |
| 1V2-BB(2F,3F)-O2 | (2-4) | 6% |
| 1V2-BB(2F,3F)-O4 | (2-4) | 3% |
| V-HHB(2F,3F)-O1 | (2-6) | 6% |
| V-HHB(2F,3F)-O2 | (2-6) | 12% |
| V-HHB(2F,3F)-O4 | (2-6) | 5% |
| 3-HDhB(2F,3F)-O2 | (2-11) | 5% |
| 3-dhBB(2F,3F)-O2 | (2-14) | 4% |
| 3-HH-V | (3-1) | 30% |
| 1-BB-3 | (3-3) | 6% |
| V-HHB-1 | (3-5) | 5% |
| 1-BB(F)B-2V | (3-8) | 3% |
| 3-HHEBH-4 | (3-9) | 3% |

NI=77.4° C.; Δn=0.112; Δ∈=2.9

| Composition (LC-F) | | |
|---|---|---|
| V2-BB(2F,3F)-O2 | (2-4) | 12% |
| 1V2-BB(2F,3F)-O2 | (2-4) | 6% |
| 1V2-BB(2F,3F)-O4 | (2-4) | 3% |
| V-HHB(2F,3F)-O1 | (2-6) | 6% |
| V-HHB(2F,3F)-O2 | (2-6) | 7% |
| V-HHB(2F,3F)-O4 | (2-6) | 5% |
| 1V2-HHB(2F,3F)-O4 | (2-6) | 5% |
| 3-HDhB(2F,3F)-O2 | (2-11) | 5% |
| 3-dhBB(2F,3F)-O2 | (2-14) | 5% |
| 3-HH-V | (3-1) | 29% |
| V2-HB-1 | (3-2) | 6% |
| V-HHB-1 | (3-5) | 5% |
| 2-BB(F)B-5 | (3-8) | 3% |
| 5-HBB(F)B-3 | (3-13) | 3% |

NI=79.0° C.; Δn=0.112; Δ∈=2.9.

| Composition (LC-G) | | |
|---|---|---|
| 3-HB(2F,3F)-O2 | (2-1) | 3% |
| V2-BB(2F,3F)-O2 | (2-4) | 11% |
| 1V2-BB(2F,3F)-O2 | (2-4) | 6% |
| V2-HHB(2F,3F)-O2 | (2-6) | 5% |
| 3-HDhB(2F,3F)-O2 | (2-11) | 5% |
| 3-HBB(2F,3F)-O2 | (2-13) | 3% |
| V-HBB(2F,3F)-O2 | (2-13) | 6% |
| V2-HBB(2F,3F)-O2 | (2-13) | 6% |
| 3-dhBB(2F,3F)-O2 | (2-14) | 5% |
| 5-HH-O1 | (3-1) | 4% |
| 3-HH-V | (3-1) | 25% |
| 3-HH-VFF | (3-1) | 3% |
| 1-BB-3 | (3-3) | 6% |
| 3-HHEH-3 | (3-4) | 3% |
| V-HHB-1 | (3-5) | 6% |
| V2-HHB-1 | (3-5) | 3% |

NI=75.3° C.; Δn=0.113; Δ∈=−2.5.

| Composition (LC-H) | | |
|---|---|---|
| V2-BB(2F,3F)-O2 | (2-4) | 10% |
| 1V2-BB(2F,3F)-O2 | (2-4) | 4% |
| 1V2-BB(2F,3F)-O4 | (2-4) | 4% |
| V-HHB(2F,3F)-O1 | (2-6) | 6% |
| V-HHB(2F,3F)-O2 | (2-6) | 10% |
| V-HHB(2F,3F)-O4 | (2-6) | 5% |
| 3-DhH1OB(2F,3F)-O2 | (2-12) | 3% |
| 3-HHB(2F,3CL)-O2 | (2-16) | 3% |
| 5-HBB(2F,3CL)-O2 | (2-17) | 3% |
| 3-H1OCro(7F,8F)-5 | (2-18) | 3% |
| 3-HH1OCro(7F,8F)-5 | (2-19) | 3% |
| 3-HH-V | (3-1) | 29% |
| 1-BB-3 | (3-3) | 6% |
| V-HHB-1 | (3-5) | 7% |
| 3-HBB-2 | (3-6) | 4% |

NI=74.5° C.; Δn=0.105; Δ∈=−3.0.

| Composition (LC-I) | | |
|---|---|---|
| V2-HB(2F,3F)-O2 | (2-1) | 5% |
| 3-H2B(2F,3F)-O2 | (2-2) | 9% |
| V-HHB(2F,3F)-O2 | (2-6) | 12% |
| 2-HH1OB(2F,3F)-O2 | (2-8) | 7% |
| 3-HH1OB(2F,3F)-O2 | (2-8) | 12% |
| 3-HDhB(2F,3F)-O2 | (2-11) | 3% |
| 2-HH-3 | (3-1) | 27% |
| 3-HH-4 | (3-1) | 4% |
| 1-BB-3 | (3-3) | 9% |
| 3-HHB-1 | (3-5) | 3% |
| 3-B(F)BB-2 | (3-7) | 3% |
| 3-HB(F)HH-5 | (3-10) | 3% |
| 3-HB(F)BH-3 | (3-12) | 3% |

NI=79.9° C.; Δn=0.092; Δ∈=−2.9.

| Composition (LC-J) | | |
|---|---|---|
| 1V2-HB(2F,3F)-O2 | (2-1) | 5% |
| 5-H2B(2F,3F)-O2 | (2-2) | 9% |
| 5-HHB(2F,3F)-O2 | (2-6) | 3% |
| V-HHB(2F,3F)-O2 | (2-6) | 6% |
| 2-HH1OB(2F,3F)-O2 | (2-8) | 7% |
| 3-HH1OB(2F,3F)-O2 | (2-8) | 12% |
| 2-BB(2F,3F)B-3 | (2-9) | 3% |
| 2-HHB(2F,3CL)-O2 | (2-16) | 3% |
| 4-HHB(2F,3CL)-O2 | (2-16) | 3% |
| 2-HH-3 | (3-1) | 22% |
| 3-HH-V | (3-1) | 8% |
| 1-BB-3 | (3-3) | 10% |
| 3-HHB-1 | (3-5) | 3% |
| 3-HB(F)HH-5 | (3-10) | 3% |
| 3-HB(F)BH-3 | (3-12) | 3% |

NI=80.5° C.; Δn=0.093; Δ∈=2.9.

| Composition (LC-K) | | |
|---|---|---|
| 3-HB(2F,3F)-O4 | (2-1) | 5% |
| V-HB(2F,3F)-O2 | (2-1) | 4% |
| V2-BB(2F,3F)-O2 | (2-4) | 7% |
| 1V2-BB(2F,3F)-O2 | (2-4) | 6% |
| 2O-B(2F,3F)B(2F,3F)-O6 | (2-5) | 3% |
| V-HHB(2F,3F)-O2 | (2-6) | 10% |
| 3-HH2B(2F,3F)-O2 | (2-7) | 3% |
| 3-HH1OB(2F,3F)-O2 | (2-8) | 10% |
| 2-BB(2F,3F)B-3 | (2-9) | 6% |
| 3-HH-V | (3-1) | 27% |
| 4-HH-V1 | (3-1) | 6% |
| 3-HH-2V1 | (3-1) | 3% |
| 3-HBB-2 | (3-6) | 7% |
| 5-HBB(F)B-2 | (3-13) | 3% |

NI=79.2° C.; Δn=0.112; Δ∈=3.1.

| Composition (LC-L) | | |
| --- | --- | --- |
| 3-HB(2F,3F)-O2 | (2-1) | 5% |
| V-HB(2F,3F)-O4 | (2-1) | 4% |
| 5-BB(2F,3F)-O2 | (2-4) | 6% |
| V2-BB(2F,3F)-O2 | (2-4) | 7% |
| 3-B(2F,3F)B(2F,3F)-O2 | (2-5) | 3% |
| V-HHB(2F,3F)-O2 | (2-6) | 10% |
| 3-HH1OB(2F,3F)-O2 | (2-8) | 10% |
| 2-BB(2F,3F)B-3 | (2-9) | 5% |
| 4-HBB(2F,3F)-O2 | (2-13) | 3% |
| 3-HBB(2F,3CL)-O2 | (2-17) | 3% |
| 3-HH-O1 | (3-1) | 3% |
| 3-HH-V | (3-1) | 24% |
| 3-HB-O2 | (3-2) | 3% |
| V-HHB-1 | (3-5) | 7% |
| 3-BB(F)B-5 | (3-8) | 3% |
| 5-HBB(F)B-2 | (3-13) | 4% |

NI=77.7° C.; Δn=0.117; Δ∈=3.1.

| Composition (LC-M) | | |
| --- | --- | --- |
| 3-BB(2F,3F)-O4 | (2-4) | 5% |
| V2-BB(2F,3F)-O2 | (2-4) | 12% |
| 1V2-BB(2F,3F)-O1 | (2-4) | 4% |
| 3-HHB(2F,3F)-O2 | (2-6) | 5% |
| V-HHB(2F,3F)-O1 | (2-6) | 6% |
| V-HHB(2F,3F)-O2 | (2-6) | 12% |
| 3-DhHB(2F,3F)-O2 | (2-10) | 5% |
| 3-HEB(2F,3F)B(2F,3F)-O2 | (2-15) | 5% |
| 3-HH-V | (3-1) | 23% |
| 4-HH-V | (3-1) | 3% |
| 5-HH-V | (3-1) | 6% |
| 7-HB-1 | (3-2) | 3% |
| V-HHB-1 | (3-5) | 5% |
| 3-HBB-2 | (3-6) | 3% |
| 2-BB(F)B-3 | (3-8) | 3% |

NI=76.3° C.; Δn=0.104; Δ∈=−3.0.

Polymerizable compound (1-1-1-1) prepared above was added to compositions (LC-B) to (LC-M), and the concentration of residual monomer and the pretilt angle before and after the UV-irradiation were measured in the same manner of Example 11. The results are shown in Table 6.

From the difference between the added amount of the polymerizable compound and the concentration of the residual monomer in Examples 15 to 26, it was found that the polymerizable compound was effectively consumed by polymerization. With regard to the pretilt angle, it was found that the polymer of polymerizable compound (1-1-1-1) was effective to give pretilt angles ranging from 0.9° to 1.8° to liquid crystal molecules in a variety of compositions. Incidentally, compound (4-1-1) was used instead of polymerizable compound (1-1-1-1) in Example 11. The pretilt angle was 0.6° and the effect was not so large. In summary, it is clear from Tables 4 to 6 that polymerizable compound (1) easily polymerized by UV light, and the concentration of the residual monomer was small. The polymer of polymerizable compound (1) is effective in giving a pretilt angle of 0.6° to 3.5° to liquid crystal molecules in a variety of compositions. A larger pretilt angle can be expected by a combination of polymerizable compounds (1) and (4). Accordingly, it is concluded that the composition of the invention has good characteristics compared to a conventional composition used for a PSA type-device.

INDUSTRIAL APPLICABILITY

The liquid crystal composition of the invention includes a polymerizable compound having a high solubility and satisfies at least one of characteristics such as a high maximum temperature, a low minimum temperature, a small viscosity, a suitable optical anisotropy, a large negative dielectric anisotropy, a large specific resistance, a high stability to ultraviolet light and a high stability to heat, or is suitably balanced between at least two of the characteristics. The LCD device of the invention that includes a composition having characteristics such as a small residual amount of the polymerizable compound and a large pretilt angle can be used widely for a liquid crystal projector, a liquid crystal television and so forth, since it has characteristics such as a small rate of image burn-in, a short response time, a large voltage holding ratio, a low threshold voltage, a large contrast ratio and a long service life.

TABLE 6

Concentration of Residual Monomer and Pretilt Angle on Compound (1-1-1-1)

| | | Polymerizable Compound | | Pretilt Angle (deree) | |
| --- | --- | --- | --- | --- | --- |
| | Composition | Formula | Added Amount (% by weight) | Residual Monomer (% by weight) | Before UV irradiation | After UV irradiation |
| Example 15 | LC-B | (1-1-1-1) | 0.80 | 0.62 | 0.2 | 1.3 |
| Example 16 | LC-C | (1-1-1-1) | 0.80 | 0.58 | 0.2 | 1.6 |
| Example 17 | LC-D | (1-1-1-1) | 0.80 | 0.55 | 0.2 | 1.8 |
| Example 18 | LC-E | (1-1-1-1) | 0.80 | 0.64 | 0.2 | 1.1 |
| Example 19 | LC-F | (1-1-1-1) | 0.80 | 0.65 | 0.2 | 1.0 |
| Example 20 | LC-G | (1-1-1-1) | 0.80 | 0.63 | 0.2 | 1.2 |
| Example 21 | LC-H | (1-1-1-1) | 0.80 | 0.64 | 0.2 | 1.1 |
| Example 22 | LC-I | (1-1-1-1) | 0.80 | 0.55 | 0.2 | 1.8 |
| Example 23 | LC-J | (1-1-1-1) | 0.80 | 0.56 | 0.2 | 1.6 |
| Example 24 | LC-K | (1-1-1-1) | 0.80 | 0.66 | 0.2 | 0.9 |
| Example 25 | LC-L | (1-1-1-1) | 0.80 | 0.64 | 0.2 | 1.1 |
| Example 26 | LC-M | (1-1-1-1) | 0.80 | 0.62 | 0.2 | 1.3 |
| Comparative Example 11 | LC-E | (4-1-1) | 0.30 | 0.25 | 0.2 | 0.6 |

What is claimed is:

1. A liquid crystal composition comprising at least one polymerizable compound represented by formula (1) and at least one compound represented by formula (2) as a first component:

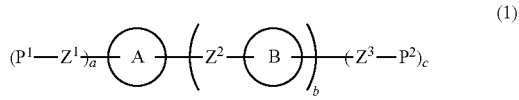
(1)

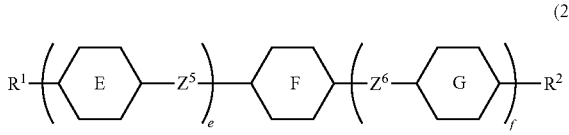
(2)

in formula (1), $P^1$ and $P^2$ are independently a polymerizable group selected from the group of groups represented by formula (P-1) to formula (P-3):

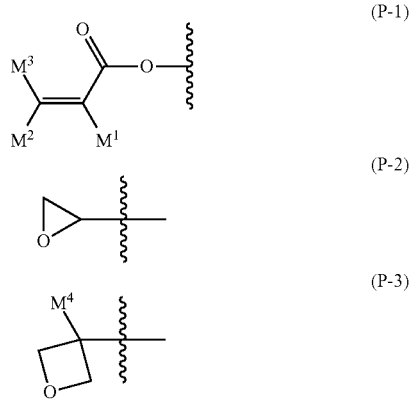

(P-1)

(P-2)

(P-3)

where in formula (P-1), $M^1$, $M^2$ and $M^3$ are independently hydrogen, fluorine, alkyl having 1 to 5 carbons, or alkyl having 1 to 5 carbons in which at least one hydrogen has been replaced by halogen, and in formula (P-3), $M^4$ is hydrogen, methyl, ethyl or propyl; ring A is a bridged ring, and in the ring at least one hydrogen may be replaced by halogen or alkyl having 1 to 12 carbons that may contain at least one halogen; ring B is a bridged ring, a cyclohexane ring, a cyclohexene ring, a benzene ring or a naphthalene ring, and in these rings at least one hydrogen may be replaced by halogen or alkyl having 1 to 12 carbons that may contain at least one halogen; $Z^1$ and $Z^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH=CH— or —C≡C—; $Z^2$ is a single bond, —COO—, —OCO— or —O—; a is 1, 2 or 3; b is 0, 1, 2 or 3; c is 1 or 2; and the sum of a and c is 2 to 4, and in formula (2), $R^1$ and $R^2$ are independently alkyl having 1 to 12 carbons, alkoxy having 1 to 12 carbons, alkenyl having 2 to 12 carbons, or alkenyloxy having 2 to 12 carbons; ring E and ring G are independently 1,4-cyclohexylene, 1,4-cyclohexenylene, 1,4-phenylene, 1,4-phenylene in which at least one hydrogen has been replaced by fluorine or chlorine, or tetrahydropyran-2,5-diyl; ring F is 2,3-difluoro-1,4-phenylene, 2-chloro-3-fluoro-1,4-phenylene, 2,3-difluoro-5-methyl-1,4-phenylene, 3,4,5-trifluoronaphthalene-2,6-diyl, or 7,8-difluorochroman-2,6-diyl; $Z^5$ and $Z^6$ are independently a single bond, —CH$_2$CH$_2$—, —CH$_2$O—, —OCH$_2$—, —COO— or —OCO—; e is 1, 2 or 3; f is 0 or 1; and the sum of e and f is 3 or less.

2. A liquid crystal composition of claim 1, wherein in formula (1), $P^1$ and $P^2$ are independently a polymerizable group selected from the group of groups represented by formula (P-1) to formula (P-3), where in formula (P-1), $M^1$, $M^2$ and $M^3$ are independently hydrogen, fluorine, alkyl having 1 to 5 carbons or alkyl having 1 to 5 carbons in which at least one hydrogen has been replaced by halogen, and in formula (P-3), $M^4$ is hydrogen, methyl, ethyl or propyl; ring A is a adamantane ring, a noradamantane ring, a diadamantane ring, a triadamantane ring or a tetraadamantane ring, and in these rings at least one hydrogen may be replaced by halogen or alkyl having 1 to 12 carbons that may contain at least one halogen; ring B is an adamantane ring, a noradamantane ring, a diadamantane ring, a cyclohexane ring, a cyclohexene ring, a benzene ring or a naphthalene ring, and in these rings at least one hydrogen may be replaced by halogen or alkyl having 1 to 12 carbons that may contain at least one halogen; $Z^1$ and $Z^3$ are independently a single bond or alkylene having 1 to 10 carbons, and in the alkylene at least one —CH$_2$— may be replaced by —O—, —COO—, —OCO— or —OCOO—, and at least one —CH$_2$—CH$_2$— may be replaced by —CH=CH— or —C≡C—; $Z^2$ is a single bond, —COO—, —OCO— or —O—; a is 1, 2 or 3; b is 0, 1, 2 or 3; c is 1 or 2; and the sum of a and c is 2 to 4.

3. The liquid crystal composition of claim 1, wherein the at least one polymerizable compound represented by formula (1) is at least one compound represented by formula (1-1):

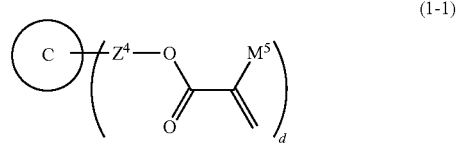
(1-1)

in formula (1-1), ring C is an adamantane ring, a noradamantane ring or a diadamantane ring, and in these rings at least one hydrogen may be replaced by halogen or alkyl having 1 to 6 carbons that may contain at least one halogen; $M^5$ is hydrogen, methyl or trifluoromethyl; $Z^4$ is a single bond or alkylene having 1 to 4 carbons, and in the alkylene at least one —CH$_2$— may be replaced by —O—, —COO—, —OCO— or —OCOO—; and d is 2, 3 or 4.

4. The liquid crystal composition of claim 1, wherein the at least one polymerizable compound represented by formula (1) is at least one compound represented by formula (1-1-1):

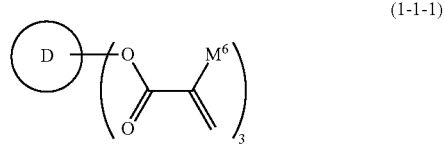
(1-1-1)

in formula (1-1-1), ring D is an adamantane ring, and in the ring at least one hydrogen may be replaced by halogen or alkyl having 1 to 3 carbons that may contain at least one halogen; and $M^6$ is hydrogen or methyl.

5. The liquid crystal composition of claim 1, wherein the first component is at least one compound selected from the group of compounds represented by formula (2-1) to formula (2-19):

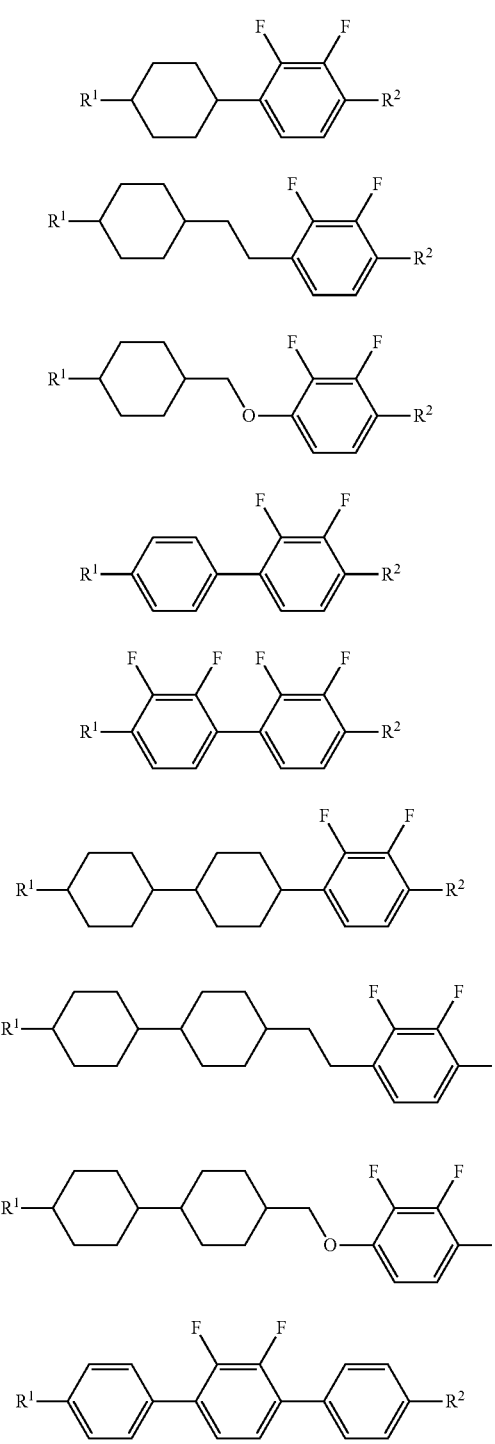

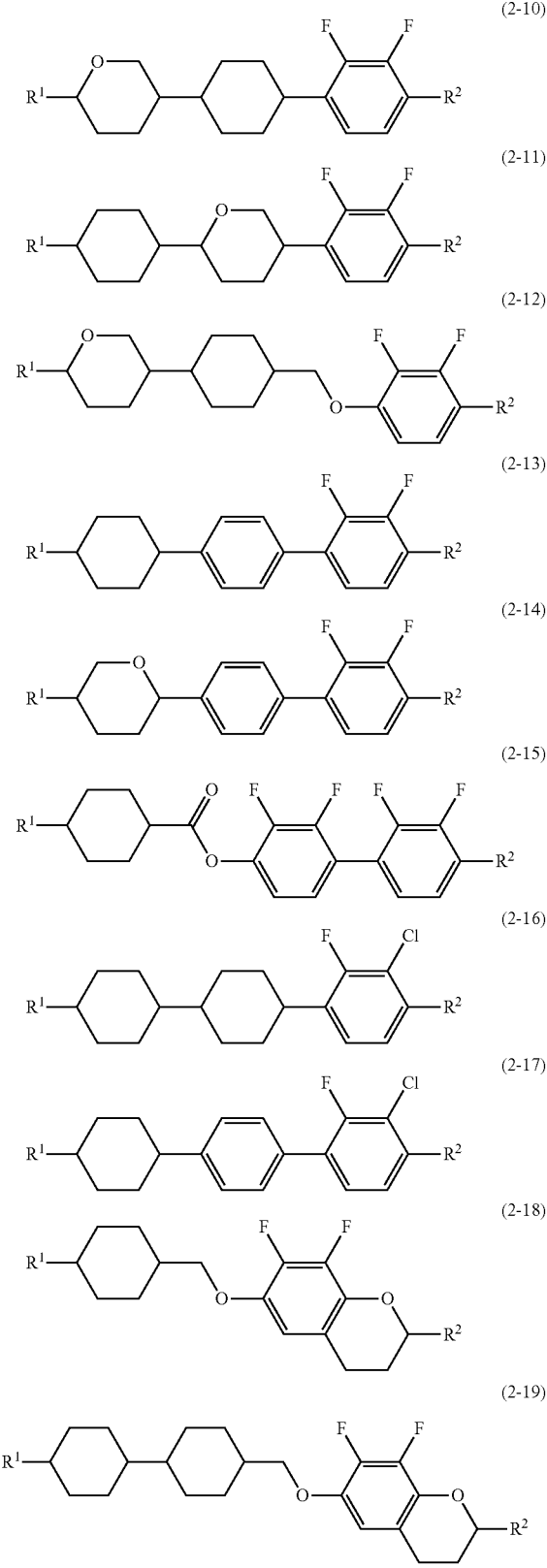

in formula (2-1) to formula (2-19), $R^1$ and $R^2$ are independently alkyl having 1 to 12 carbons, alkoxy having 1 to 12 carbons, or alkenyl having 2 to 12 carbons.

6. The liquid crystal composition of claim 1, wherein the ratio of the first component is in the range of 10 wt % to 90 wt % based on the weight of the liquid crystal composition.

7. The liquid crystal composition of claim 1, further comprising at least one compound represented by formula (3) as a second component:

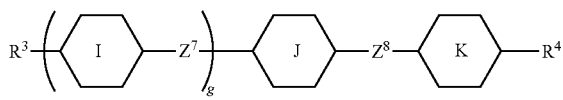
(3)

where $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine; ring I, ring J and ring K are independently 1,4-cyclohexylene, 1,4-phenylene or 2-fluoro-1,4-phenylene; $Z^7$ and $Z^8$ are independently a single bond, —CH$_2$CH$_2$—, —CH$_2$O—, —OCH$_2$—, —COO— or —OCO—; and g is 0, 1 or 2.

8. The liquid crystal composition of claim 7, wherein the second component is at least one compound selected from the group of compounds represented by formula (3-1) to formula (3-13):

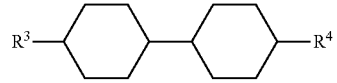
(3-1)

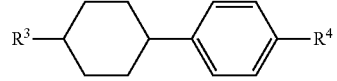
(3-2)

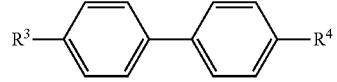
(3-3)

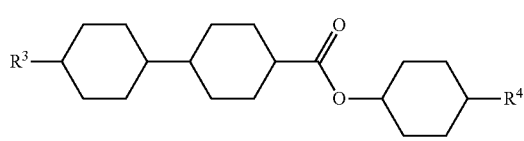
(3-4)

(3-5)

(3-6)

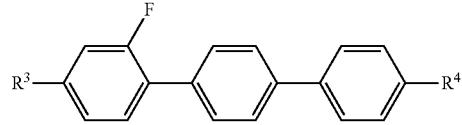
(3-7)

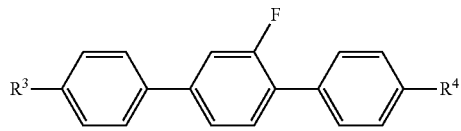
(3-8)

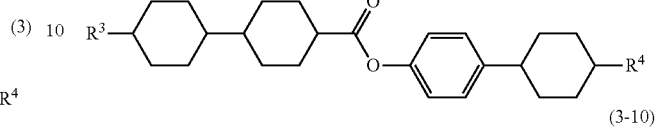
(3-9)

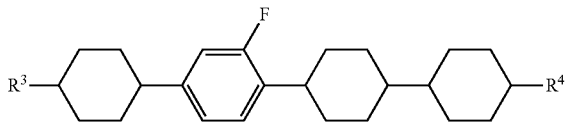
(3-10)

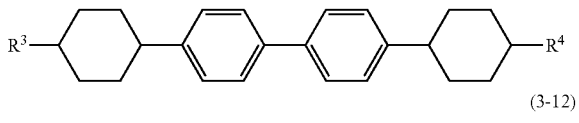
(3-11)

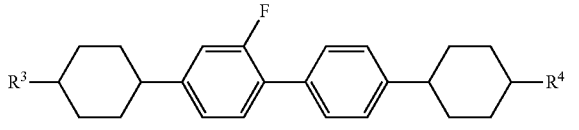
(3-12)

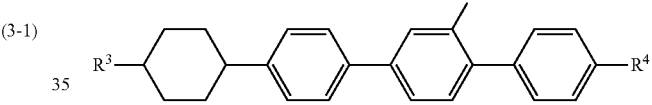
(3-13)

in formula (3-1) to formula (3-13), $R^3$ and $R^4$ are independently alkyl having 1 to 12 carbons, alkoxy having 1 to 12 carbons, alkenyl having 2 to 12 carbons, or alkenyl having 2 to 12 carbons in which at least one hydrogen has been replaced by fluorine.

9. The liquid crystal composition of claim 7, wherein a proportion of the second component is in a range of 10 wt % to 90 wt % based on a weight of the liquid crystal composition.

10. The liquid crystal composition of claim 1, further comprising at least one polymerizable compound represented by formula (4):

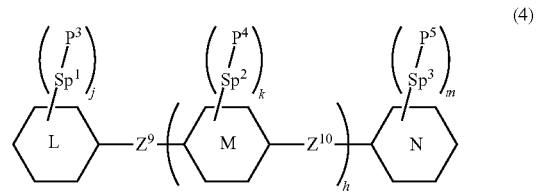
(4)

in formula (4), ring L and ring N are independently cyclohexyl, cyclohexenyl, phenyl, 1-naphthyl, 2-naphthyl, tetrahydropyran-2-yl, 1,3-dioxane-2-yl, pyrimidine-2-yl or pyridine-2-yl, and in these rings at least one hydrogen may be replaced by halogen, alkyl having 1 to 12 carbons, alkoxy having 1 to 12 carbons, or alkyl having 1 to 12 carbons in which at least one hydrogen has been replaced by halogen; ring M is 1,4-cyclohexylene, 1,4-cyclohexenylene, 1,4-phenylene, naphthalene-1,2-diyl, naphthalene-1,3-diyl, naphthalene-1,4-diyl, naphthalene-1,5-diyl, naphthalene-1,6-diyl, naphthalene-1,7-diyl, naphthalene-1,8-diyl, naphthalene-2,3-diyl, naphthalene-2,6-diyl, naphthalene-2,7-diyl, tetrahydropyran-2,5-diyl, 1,3-dioxane-2,5-diyl, pyrimidine-2,5-diyl or pyridine-2,5-diyl, and in these rings at least one hydrogen may be replaced by halogen, alkyl having 1 to 12 carbons, alkoxy having 1 to 12 carbons, or alkyl having 1 to 12 carbons in which at least one hydrogen has been replaced by halogen; $Z^9$ and $Z^{10}$ are independently a single bond or alkylene having 1 to 10 carbons, and in the alkylene at least one —CH$_2$— may be replaced by —O—, —CO—, —COO— or —OCO—, and at least one —CH$_2$—CH$_2$— may be replaced by —CH═CH—, —C(CH$_3$)═CH—, —CH═C(CH$_3$)— or —C(CH$_3$)═C(CH$_3$)—, and in these groups at least one hydrogen may be replaced by fluorine or chlorine; $P^3$, $P^4$ and $P^5$ are independently a polymerizable group; $Sp^1$, $Sp^2$ and $Sp^3$ are independently a single bond or alkylene having 1 to 10 carbons, and in the alkylene at least one —CH$_2$— may be replaced by —O—, —COO—, —OCO— or —OCOO—, at least one —CH$_2$—CH$_2$— may be replaced by —CH═CH— or —C≡C—, and in these groups at least one hydrogen may be replaced by fluorine or chlorine; h is 0, 1 or 2; j, k and m are independently 0, 1, 2, 3 or 4; and the sum of j, k and m is 1 or more.

11. The liquid crystal composition of claim 10, wherein in formula (4) according to claim 10, $P^3$, $P^4$ and $P^5$ are independently a polymerizable group selected from the group of groups represented by formula (P-4) to formula (P-9):

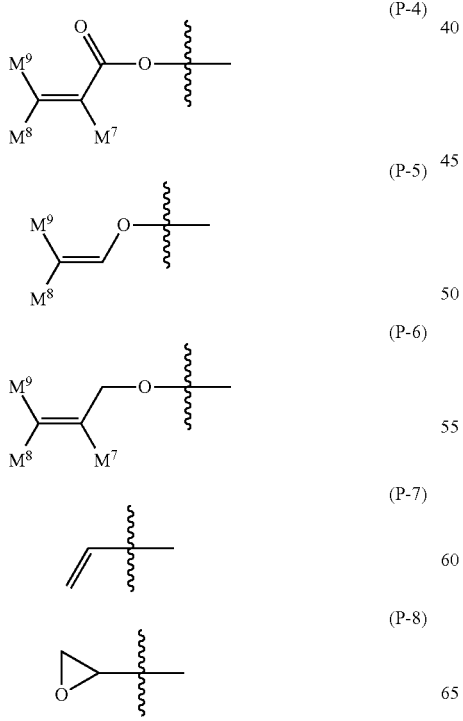

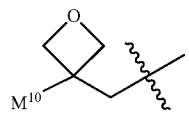

in formula (P-4) to formula (P-6), $M^7$, $M^8$ and $M^9$ are independently hydrogen, fluorine, alkyl having 1 to 5 carbons or alkyl having 1 to 5 carbons in which at least one hydrogen has been replaced by halogen; in formula (P-9), $M^{10}$ is hydrogen, methyl, ethyl or propyl; and when all of the j-numbering $P^3$ and the m-numbering $P^5$ are a group represented by formula (P-7), at least one of the j-numbering $Sp^1$ and the m-numbering $Sp^3$ is alkylene in which at least one —CH$_2$— has been replaced by —O—, —COO—, —OCO— or —OCOO—.

12. The liquid crystal composition of claim 10, wherein the at least one polymerizable compound represented by formula (4) is at least one compound selected from the group of compounds represented by formulae (4-1) to (4-27):

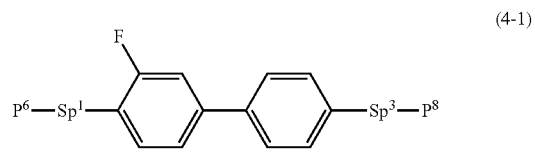

(4-1)

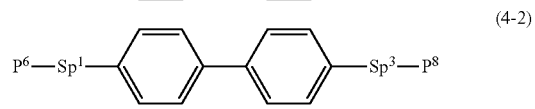

(4-2)

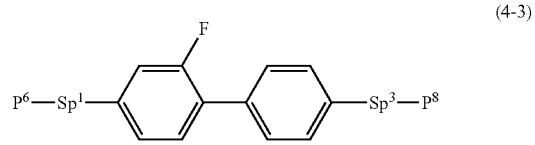

(4-3)

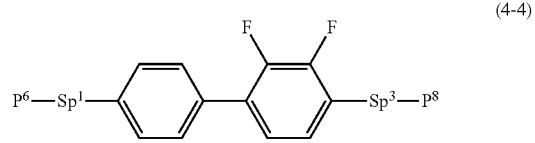

(4-4)

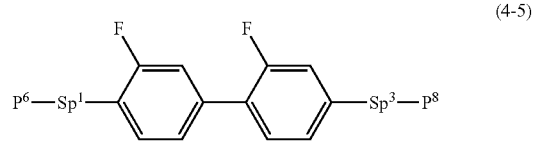

(4-5)

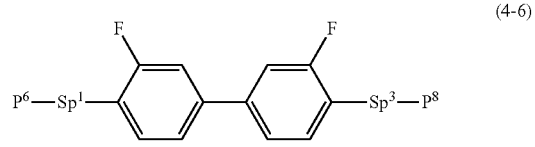

(4-6)

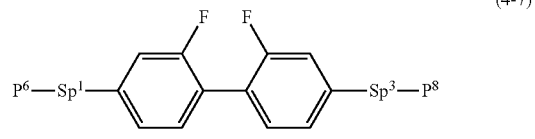

(4-7)

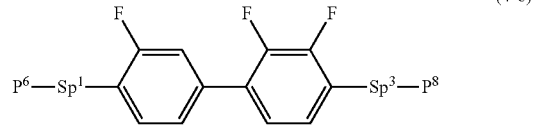

(4-8)

-continued in formulae (4-1) to (4-27), $P^6$, $P^7$ and $P^8$ are independently a polymerizable group selected from the group of groups represented by formulae (P-4) to (P-6):

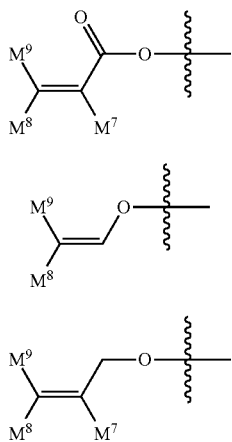

(P-4)

(P-5)

(P-6)

where in formulae (P-4) to (P-6), $M^7$, $M^8$ and $M^9$ are independently hydrogen, fluorine, alkyl having 1 to 5 carbons, or alkyl having 1 to 5 carbons in which at least one hydrogen has been replaced by halogen; and $Sp^1$, $Sp^2$ and $Sp^a$ are independently a single bond or alkylene having 1 to 10 carbons, and in the alkylene at least one —$CH_2$— may be replaced by —O—, —COO—, —OCO— or —OCOO—, and at least one —$CH_2$—$CH_2$— may be replaced by —CH=CH— or —C≡C—, and in these groups at least one hydrogen may be replaced by fluorine or chlorine.

13. The liquid crystal composition of claim 1, wherein a proportion of the at least one polymerizable compound represented by formula (1) is in a range of 0.03 wt % to 10 wt % based on a weight of the liquid crystal composition.

14. The liquid crystal composition of claim 10, wherein a proportion of a total amount of the at least one polymerizable compound represented by formula (1) and the at least one polymerizable compound represented by formula (4) is in a range of 0.03 wt % to 10 wt % based on a weight of the liquid crystal composition.

15. A liquid crystal display device comprising the liquid crystal composition of claim 1.

16. The liquid crystal display device of claim 15, of which an operating mode is an IPS mode, a VA mode, an FFS mode or an FPA mode, and a driving mode is an active matrix mode.

17. A liquid crystal display device of a polymer sustained alignment type, comprising the liquid crystal composition of claim 1 in which the polymerizable compound has been polymerized.

* * * * *